United States Patent
Carlson et al.

(10) Patent No.: US 12,214,912 B2
(45) Date of Patent: Feb. 4, 2025

(54) IN-SPACE GRASPING SYSTEM AND METHOD OF OPERATION

(71) Applicant: Honeybee Robotics, LLC, Longmont, CO (US)

(72) Inventors: Lee Carlson, Broomfield, CO (US); Shazad Sadick, Franklin Square, NY (US); Jeffrey I. Shasho, Brooklyn, NY (US); John Wilson, Brooklyn, NY (US); Jonah E. Saltzman, Brooklyn, NY (US); Erik Mumm, Longmont, CO (US); Jason Herman, North Bellmore, NY (US)

(73) Assignee: Honeybee Robotics, LLC, Longmont, CO (US)

(*) Notice: Subject to any disclaimer, the term of this patent is extended or adjusted under 35 U.S.C. 154(b) by 674 days.

(21) Appl. No.: 17/323,519

(22) Filed: May 18, 2021

(65) Prior Publication Data
US 2021/0362885 A1 Nov. 25, 2021

Related U.S. Application Data

(60) Provisional application No. 63/027,579, filed on May 20, 2020.

(51) Int. Cl.
*B64G 1/64* (2006.01)

(52) U.S. Cl.
CPC ............ *B64G 1/641* (2013.01); *B64G 1/646* (2013.01)

(58) Field of Classification Search
CPC .......... B64G 1/64; B64G 1/646; B64G 1/641
See application file for complete search history.

(56) References Cited

U.S. PATENT DOCUMENTS

| | | | | |
|---|---|---|---|---|
| 4,607,815 A | * | 8/1986 | Turci | B64G 1/646 403/381 |
| 5,125,601 A | * | 6/1992 | Monford, Jr. | B64G 1/641 901/30 |
| 5,174,772 A | * | 12/1992 | Vranish | B64G 1/641 439/131 |
| 6,269,748 B1 | | 8/2001 | Rudoy et al. | |
| 6,742,745 B2 | * | 6/2004 | Tchoryk | B64G 1/646 244/172.4 |
| 7,070,151 B2 | | 7/2006 | D'Ausilio et al. | |

(Continued)

FOREIGN PATENT DOCUMENTS

DE 102021124486 A1 * 3/2022 .......... B25J 15/0019
RU 2662605 C2 * 7/2018

*Primary Examiner* — Magdalena Topolski
(74) *Attorney, Agent, or Firm* — McCarter & English, LLP

(57) ABSTRACT

A coupling system and a method of coupling two objects. The coupling system including a passive unit having a first side and an opposing second side, the first side having a recess with a lip. The coupling system further having an active unit that includes an actuator, a cam mechanism and a plurality of capture rollers. The cam mechanism is operably coupled to the actuator, the cam mechanism being movable from a stowed position to a deployed position. The plurality of capture rollers is operably coupled to the cam mechanism to move from a first position to a second position in response to the cam mechanism moving from the stowed position to the deployed position, the plurality of capture rollers engaging the lip in the second position when the passive unit is in contact with the active unit.

22 Claims, 27 Drawing Sheets

(56) References Cited

U.S. PATENT DOCUMENTS

| | | | |
|---|---|---|---|
| 7,611,097 | B2 | 11/2009 | D'Ausilio et al. |
| 7,828,249 | B2 * | 11/2010 | Ritter .................... B64G 1/646 244/172.4 |
| 8,702,341 | B2 * | 4/2014 | Ravindran ........ B23B 31/10741 403/376 |
| 9,669,950 | B2 * | 6/2017 | Rembala ................. B64G 1/222 |
| 10,279,933 | B2 * | 5/2019 | Lakshmanan .......... B64G 1/646 |
| 2018/0148197 | A1 | 5/2018 | Halsband et al. |
| 2019/0168395 | A1 * | 6/2019 | Hay ....................... B25J 9/0009 |
| 2021/0170587 | A1 | 6/2021 | Tanishima et al. |
| 2022/0297859 | A1 * | 9/2022 | Turner .................... B64G 1/64 |

\* cited by examiner

IN-SPACE GRASPING SYSTEM AND METHOD OF OPERATION

CROSS-REFERENCE TO RELATED APPLICATIONS

The present application claims the benefit of and is a nonprovisional application of U.S. Provisional Application Ser. No. 63/027,579 filed on May 20, 2020, the contents of which are incorporated by reference herein in its entirety.

BACKGROUND

The subject matter disclosed herein relates to a system for coupling two devices or objects, such as an integrated mechanism and receptacle that is a common interface for the in-space assembly of subsystems, payloads, structures.

Typically extraterrestrial vehicles and devices, such as satellites for example, are coupled to another system, such as a launch vehicle for example, using a single use connection. This connection, sometimes referred to as a frangible joint, that irreversible disconnects (e.g. fractures) when the satellite is separated from the system.

There are many satellites in the range of altitudes generally referred to as Low Earth Orbit (LEO), particularly proximal to the lower reaches of the Van Allen belts. One preferred band of altitudes above the Earth's surface for LEO satellite operation is between 200 km (kilometers) and 1500 km in mid inclinations, or 200 km to 1000 km in polar inclinations.

LEO satellites may malfunction for a variety of reasons including, but not limited to, failure of booms or panels to deploy, computer or transponder failure, upper stage rocket failure, loss of orientation in relation to the sun and subsequent power loss, fundamental design flaws such as optical systems that cannot focus properly or running out of fuel required for orbital station keeping or maneuvering. Currently, in most cases, a malfunctioning satellite is declared a complete loss and is replaced by a new satellite. This costs many tens of millions of dollars for commercial LEO satellites, hundreds of millions of dollars for commercial Geostationary Earth Orbit (GEO) satellites, and upwards of a billion dollars for many defense-related satellites. In addition to the cost of replacement there is also a delay caused by the need to build a replacement satellite.

In a few cases, the failure of some satellites has been remedied by in-orbit repair of the satellite or recapture of the satellite to Earth-bound repair and re-launch. In 1995, NASA used the Space Shuttle to repair faulty optics on the $1.5 billion Hubble Space Telescope. Using the Shuttle's robotic arm to grapple the Hubble telescope in its 600 kilometer altitude orbit, astronauts put on spacesuits, went out into space and replaced major sub-components of the Hubble system. Then, in 1997, NASA used the Shuttle to perform additional in-orbit repairs on the Hubble Space Telescope to fix failed inertial navigation sub-systems and to upgrade the Hubble Space Telescope with improved optics.

The use of the Space Shuttle for a repair mission, at an estimated mission cost of $500 million, is only practical and cost-effective for high value satellites (e.g. greater than half a billion dollars), and then only for satellites in orbits accessible by the Shuttle—from about 28.6 degrees inclination to 57 degrees inclination under normal circumstances, and under 650 kilometers altitude. With the current mix and positions of satellites in orbit today, that limits this repair scenario to less than one percent of the satellites in Earth orbit.

Satellite servicing vehicles, typically unmanned automated systems, have been proposed. The use of a robotic arm may be used to capture the satellite, however, it is typically not sufficient to hold the satellite during repairs. Further, the robotic arm does not allow for an electrical connection between the repair vehicle and the satellite.

Accordingly while existing coupling systems are suitable for their intended purposes, the need for improvement remains, particularly in providing a coupling system that can repeatedly capture and release devices or objects in space.

BRIEF DESCRIPTION

According to one aspect of the disclosure a coupling system is provided. The coupling system including a passive unit having a first side and an opposing second side, the first side having a recess with a lip. The coupling system further having an active unit that includes an actuator, a cam mechanism and a plurality of capture rollers. The cam mechanism is operably coupled to the actuator, the cam mechanism being movable from a stowed position to a deployed position. The plurality of capture rollers is operably coupled to the cam mechanism to move from a first position to a second position in response to the cam mechanism moving from the stowed position to the deployed position, the plurality of capture rollers engaging the lip in the second position when the passive unit is in contact with the active unit.

In addition to one or more of the features described herein, or as an alternative, further embodiments of the system may include a launch lock device operably coupled to lock the cam mechanism in the stowed position when in an unactuated configuration. In addition to one or more of the features described herein, or as an alternative, further embodiments of the system may include the launch lock being disengaged from the cam mechanism when in an actuated configuration. In addition to one or more of the features described herein, or as an alternative, further embodiments of the system may include the plurality of capture rollers and the passive unit being configured to allow engagement of the capture rollers with the lip when the passive unit is positioned within a capture envelope.

In addition to one or more of the features described herein, or as an alternative, further embodiments of the system may include the cam mechanism further comprising: a gear operably coupled to the actuator; at least one first lead-screw operably coupled to the gear; an elevator plate operably and movably coupled to the at least one lead-screw, the elevator plate having at least one first cam slot; and at least one roller assembly operably and movably coupled to the at least one first cam slot, the at least one roller assembly being movable from an entry position to a docked position in response to activation of the actuator, the plurality of capture rollers being coupled to the at least one roller assembly.

In addition to one or more of the features described herein, or as an alternative, further embodiments of the system may include the cam mechanism further comprising a static cam plate having at least one second cam slot, the at least one roller assembly being operably coupled to the at least one second cam slot. In addition to one or more of the features described herein, or as an alternative, further embodiments of the system may include the at least one roller assembly having a preload cross-shaft, the preload cross-shaft being operably and movably coupled to the at least one first cam slot and the at least one second cam slot, the preload cross-shaft cooperates with the at least one first cam slot to move the plurality of rollers in a first direction and cooperates with the at least one second cam slot to move the plurality of rollers in a second direction, the plurality of capture rollers being positioned to engage the passive unit when in the docked position.

In addition to one or more of the features described herein, or as an alternative, further embodiments of the system may include the cam assembly further comprising a central lead screw movably coupled to the gear to move from a retracted position to a connected position as the cam mechanism moved from a stowed position to a deployed position. In addition to one or more of the features described herein, or as an alternative, further embodiments of the system may include the movement of the central lead screw from the retracted position to the connected position being co-axial with an axis of rotation of the gear.

In addition to one or more of the features described herein, or as an alternative, further embodiments of the system may include a first electrical connector coupled to the central lead screw, and a second electrical connector coupled to the passive member. In addition to one or more of the features described herein, or as an alternative, further embodiments of the system may include the first electrical connector being coupled to the second electrical connector when the central lead screw is in the connected position and the passive unit is in the docked position.

In addition to one or more of the features described herein, or as an alternative, further embodiments of the system may include a housing, the cam mechanism being disposed within the housing, the housing having a recess on one end, the plurality of capture rollers being at least partially disposed within the recess, and a plurality of ground rollers disposed about the periphery of the recess. In addition to one or more of the features described herein, or as an alternative, further embodiments of the system may include the plurality of capture rollers having a first pair of capture rollers and a second pair of capture rollers. The first pair of capture rollers being coupled together by a first slide plate and the second pair of capture rollers being coupled together by a second slide plate.

In addition to one or more of the features described herein, or as an alternative, further embodiments of the system may include the actuator being an electric motor. In addition to one or more of the features described herein, or as an alternative, further embodiments of the system may include the actuator is a mechanical link.

In accordance with another aspect of the disclosure, a method of coupling a passive unit to an active unit is provided. The method includes moving the passive unit towards the active unit, the passive unit having a recess on one face and a plurality of lips disposed within the recess. At least a portion of the passive unit is positioned within a capture envelope adjacent to at least one of a plurality of capture rollers on the active unit. A cam mechanism is activaged in the active unit to move the plurality of capture rollers in a first direction from a first position to a second position. The plurality of lips engage with the plurality of rollers as the plurality of rollers move from the first position to the second position. The plurality of capture rollers move in a second direction to move the passive unit into a docked position, the second direction being perpendicular to the first direction.

In addition to one or more of the features described herein, or as an alternative, further embodiments of the method may include fixing the cam mechanism in a stowed position with a launch lock device, and activating the launch lock device prior to moving the cam mechanism from the stowed position to a deployed position. In addition to one or more of the features described herein, or as an alternative, further embodiments of the method may include the activating of the cam mechanism includes moving the cam mechanism from stowed position to a deployed position.

In addition to one or more of the features described herein, or as an alternative, further embodiments of the method may include the moving of the cam mechanism from the stowed position to the deployed position further comprising: rotating a gear with an actuator; rotating at least one first lead-screw with the gear; moving an elevator plate along the lead-screw in response to the rotation of the lead-screw; and causing the plurality of capture rollers to move in the first direction in response to movement of the elevator plate.

In addition to one or more of the features described herein, or as an alternative, further embodiments of the method may include the causing of the plurality of capture rollers to move in the first direction further includes moving a roller assembly along a first cam slot in the elevator plate, and the movement of the plurality of capture rollers in the second direction further includes moving the roller assembly along a second cam slot in a static cam plate. In addition to one or more of the features described herein, or as an alternative, further embodiments of the method may include rotating a central lead screw with the gear, and axially moving a first connector in a third direction in response to the rotation of the central lead screw. In addition to one or more of the features described herein, or as an alternative, further embodiments of the method may include connecting the first connector to a second connector when the cam mechanism is in the deployed position and the passive unit is in the docked position.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 6C is a plan view of an electrical connector for the passive unit of FIG. 6A.

Figure 1A:
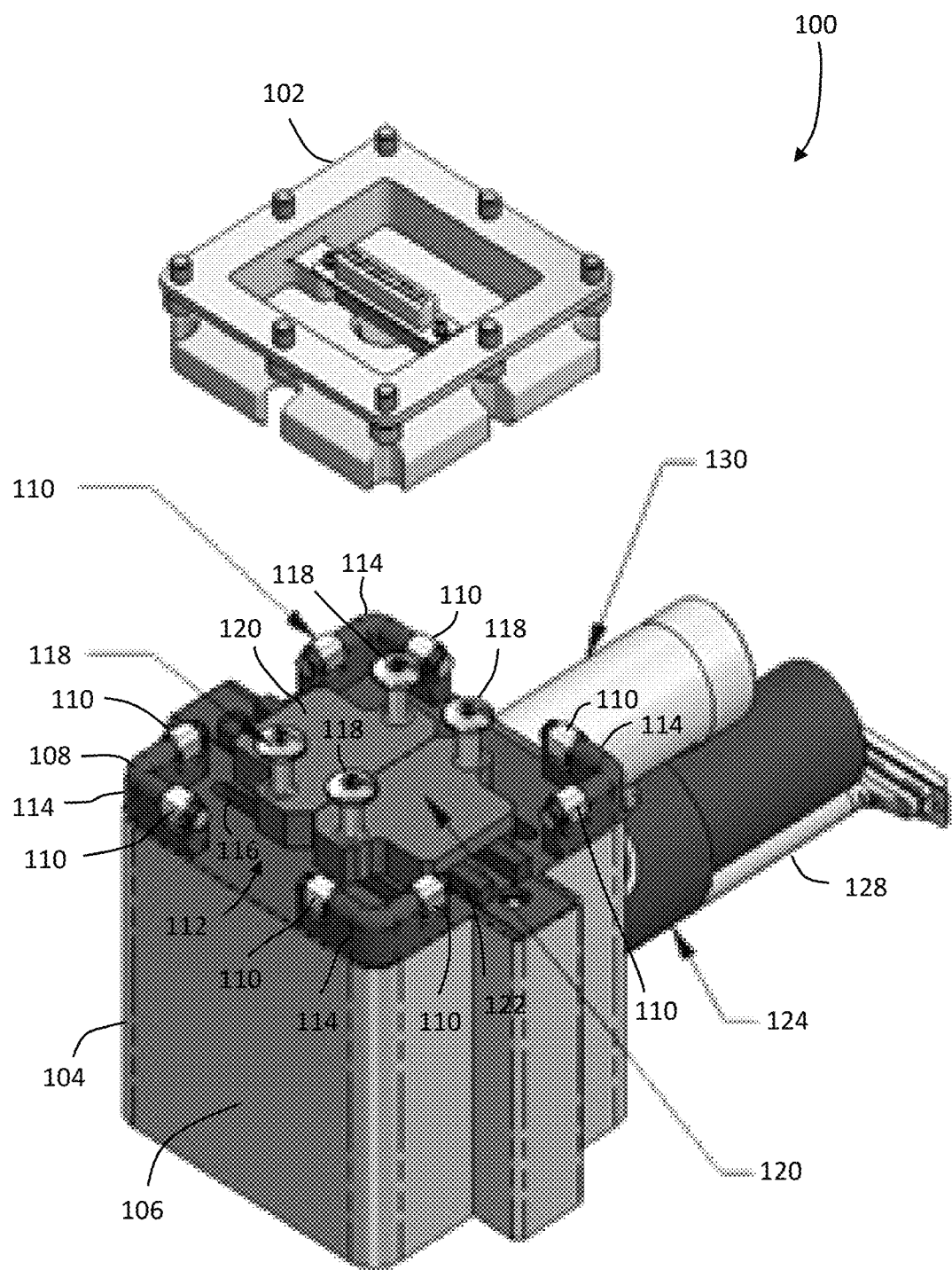
FIG. 1A is a perspective view of a satellite grasping system in accordance with an embodiment.
Figure 1B:
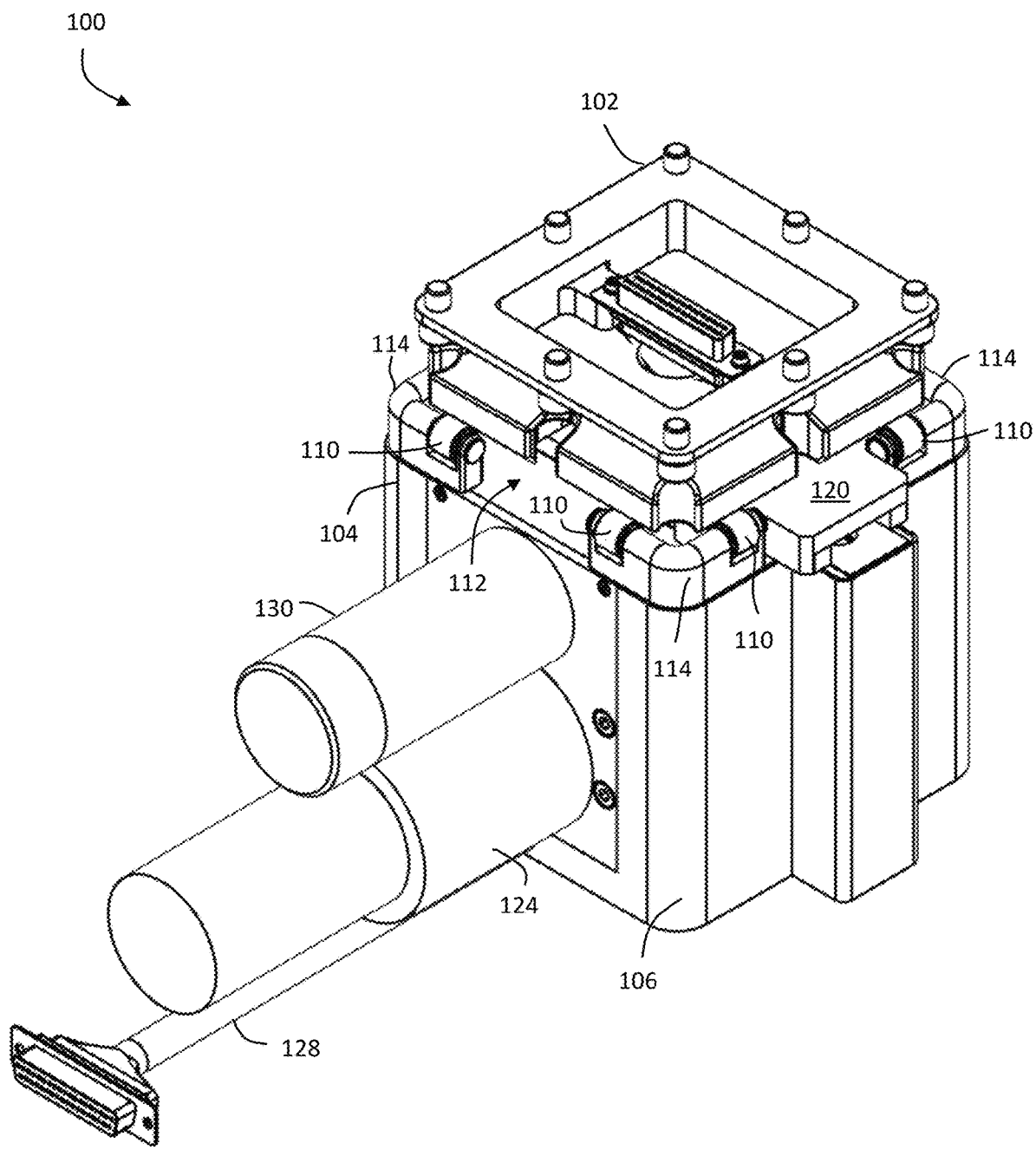
FIG. 1B is a perspective view of the system of FIG. 1A with the passive member coupled to the active assembly.
Figure 1C:
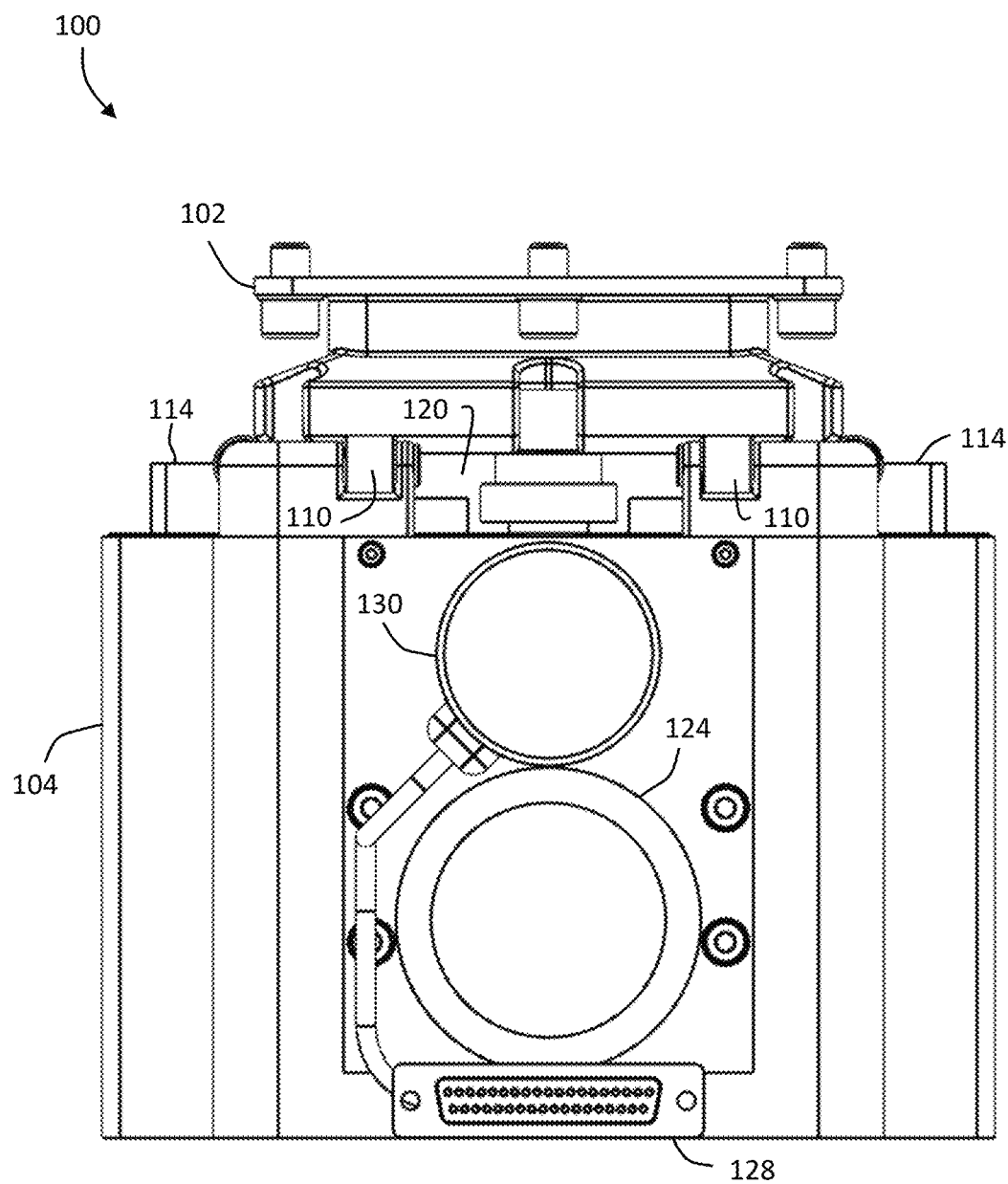
FIG. 1C, 1D and FIG. 1E are front, side and top views of the system of FIG. 1A.
Figure 1D:
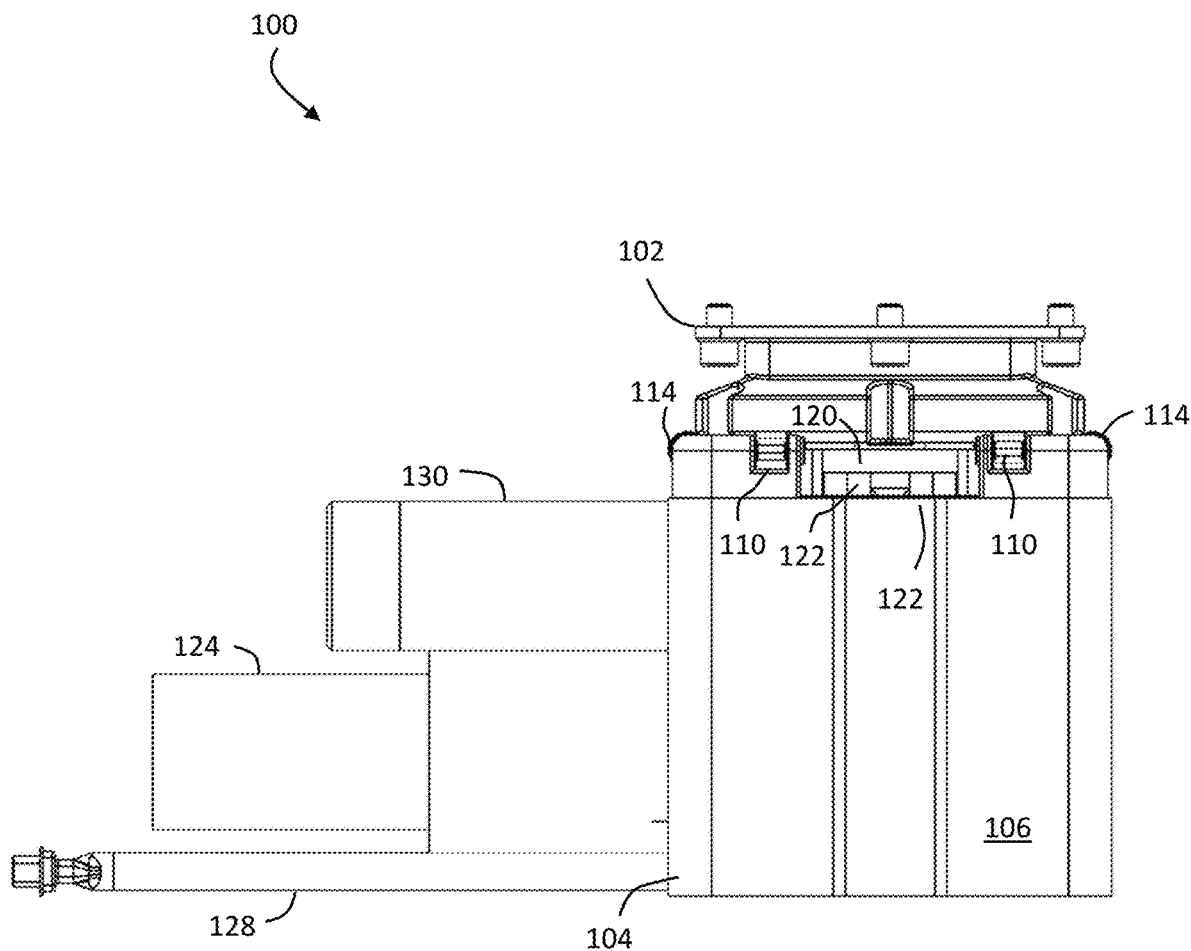
Figure 1E:
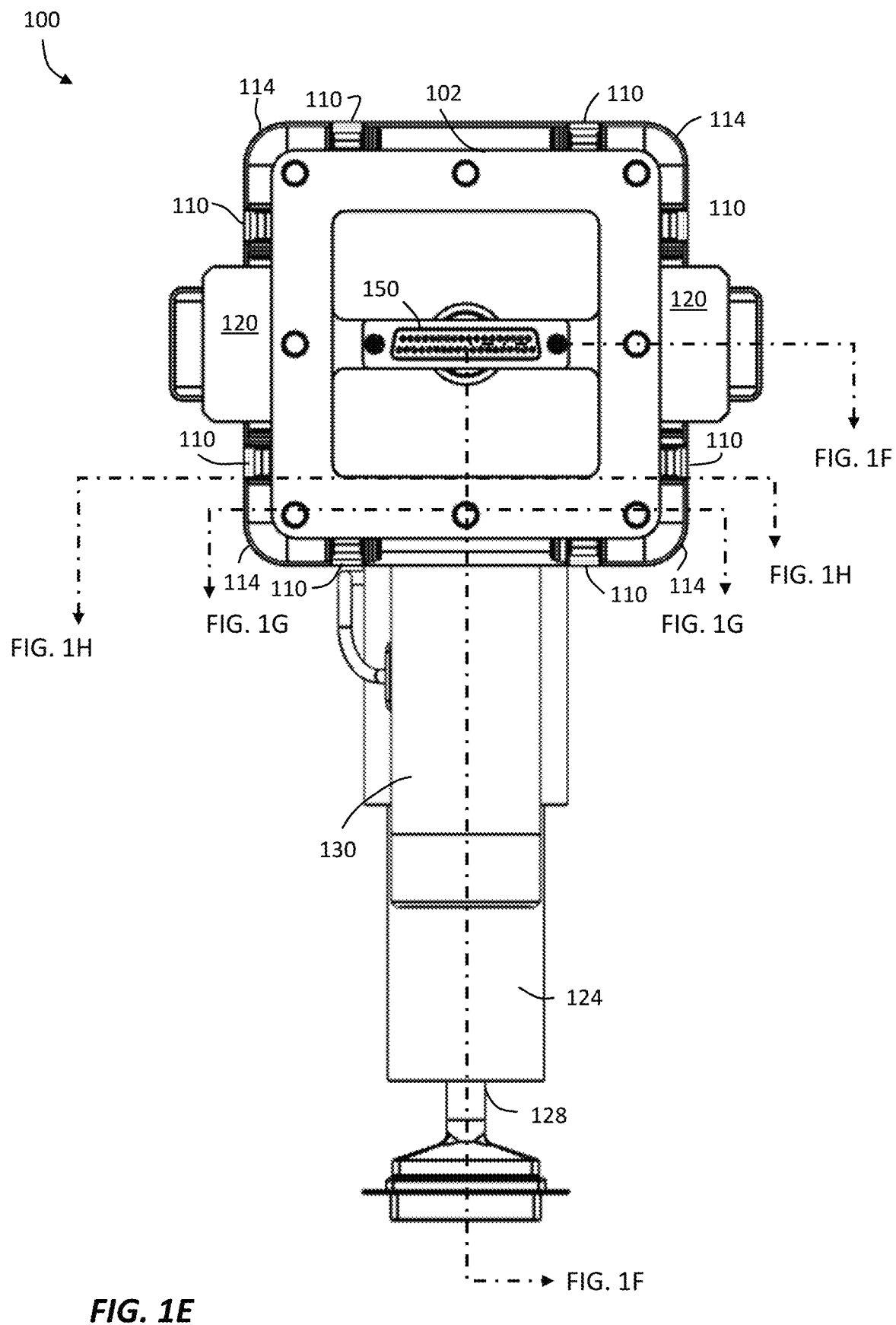

The detailed description explains embodiments of the disclosure, together with advantages and features, by way of example with reference to the drawings.

DETAILED DESCRIPTION

Embodiments of the present disclosure include a system for coupling devices, objects or components, such as but not limited to satellites and other extra-terrestrial assemblies for example. Embodiments of the present disclosure includes a system that provides advantages in both mechanically and electrically connecting a passive unit to an active unit. Embodiments of the present disclosure further allows for initial linear and angular misalignment between the passive and active units. Still further embodiments of the present disclosure provide rollers that reduce sliding contact to increase reliability and resilience in high friction environments such as a space environment.

It should be appreciated that while embodiments of the present disclosure focus on satellite servicing and capturing satellites, this is for example purposes and the claims should not be so limited. In other embodiments, the systems and methods described herein may be used in a variety of space environment applications, such as but not limited to orbital replacement unit (ORU) pick-and-place operations, hosted payload attachments, as an end-of-arm tool, or as an arm integrated mechanism and receptacle as a common interface for the in-space assembly of subsystems, payloads, and structures for example.

Referring now to FIGS. 1A-1J, an embodiment of a coupling system 100 is shown having a passive unit 102 and an active unit 104. In an embodiment, the passive unit 102 may be coupled to, or incorporated in, an extra-terrestrial assembly, such as a satellite for example. In an embodiment, the active unit 104 may be coupled to, or incorporated into, another extra-terrestrial assembly such as on a robotic arm for example. In an embodiment, the system 100 provides advantages in having a low profile/height and a multi-faceted connection that allows coupling in any of four 90 degree increment orientations. In other embodiments, the system 100 may be configured to allow a coupling in a single orientation.

The active unit 104 includes a housing 106 with an end plate 108. Attached to the end plate 108 are a plurality of ground rollers 110. In an embodiment, the ground rollers may be tapered or angled rollers. The ground rollers 110 are rotationally coupled to the end plate and allow the passive unit 102 to seat against the ground rollers 110 when the passive unit 102 docks to the active unit 104. In an embodiment, the ground rollers provide advantages in providing a closed loop force path and eliminating any gap between the active unit 104 and the passive unit 102. In an embodiment, the ground rollers further provide advantages relative to static circular components by reducing sliding contact to increase reliability and resilience in high friction environments such as the space environment.

The end plate 108 includes a recessed area 112 defined by the projections 114. The recessed area 112 includes a plurality of slots 116 through which pass a plurality of capture rollers 118. As will be discussed in more detail herein, the capture rollers 118 are configured to move from a first position (FIG. 1) in a first direction along the slots 116 to a second position adjacent the ground rollers 110 (FIG. 1J) to capture and center the passive unit 102. In an embodiment, as will be discussed in more detail herein, the capture rollers 118 move in a second direction towards the slot 116 to secure the passive unit 102 against the ground rollers 110.

In an embodiment the plurality of capture rollers 118 are composed of a first pair of capture rollers and a second pair of capture rollers. Each pair of capture rollers is connected via a slide plate 120. The slide plates 120 connect and support each of the capture rollers in the pair. In an embodiment, the slide plates 120 are engaged by at least one rail 122 that is oriented in a direction parallel with the slots 116.

Attached to, or extending from, a side of the housing 106 is an actuator 124. In an embodiment, the actuator 124 may be a direct current electric motor for example. In another embodiment, the actuator 124 may be a mechanical link that is driven by an electric motor residing outside of the system 100. For example, a robotic arm's tool changer mechanism may have a rotary mechanical feedthrough to provide mechanical power to a tool rather than provide electrical power to an actuator in the tool. This rotary mechanical feedthrough may be used to actuate the system 100. The actuator 124 engages a cam mechanism 126 (FIG. 1F) as will be discussed in more detail below. Also extending from the side of the house 106 is an electrical connector 128. As will be discussed in more detail below, the electrical connector 128 is movably coupled to the cam mechanism 126 to move from a stowed position to a deployed position where the electrical connector is electrically coupled to the passive unit 102. In an embodiment, the active unit 104 further includes a launch lock device such as a kinetic fastener 130 or release mechanism, that is similar to that described in U.S. Pat. No. 6,269,748, the contents of which are incorporated by reference herein. The launch lock device allows the system 100 to be subjected to launch loading conditions without damage. In other embodiments, a non-kinetic fasteners based on shape memory alloys may be used. In still other embodiments, other launch lock devices that are known in the art may be used.

Figure 1F:
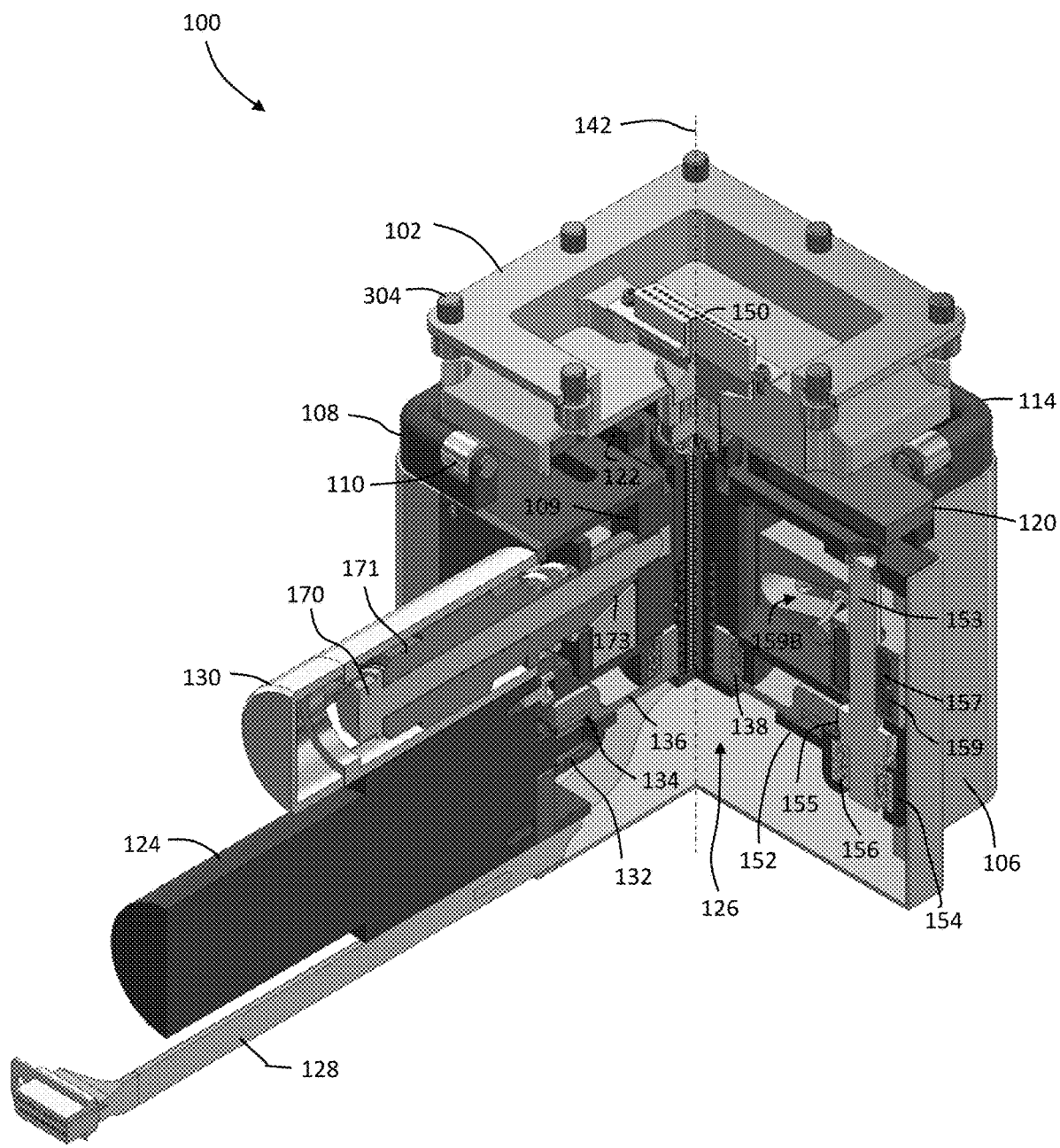
FIG. 1F is a perspective view, partially in section, of the system of FIG. 1A.
Figure 1G:
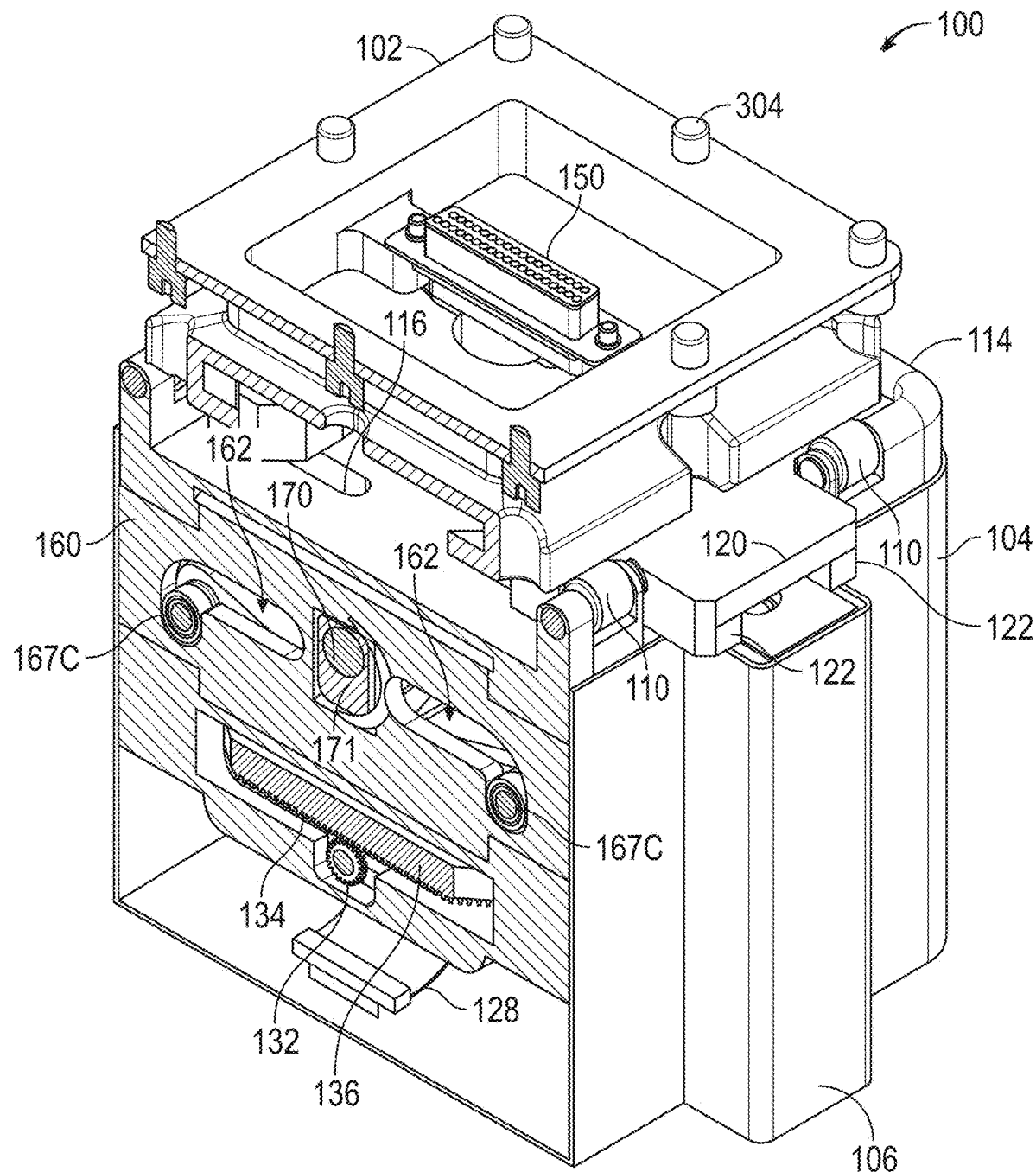
FIG. 1G is a perspective sectional view of the system of FIG. 1A.
Figure 1H:
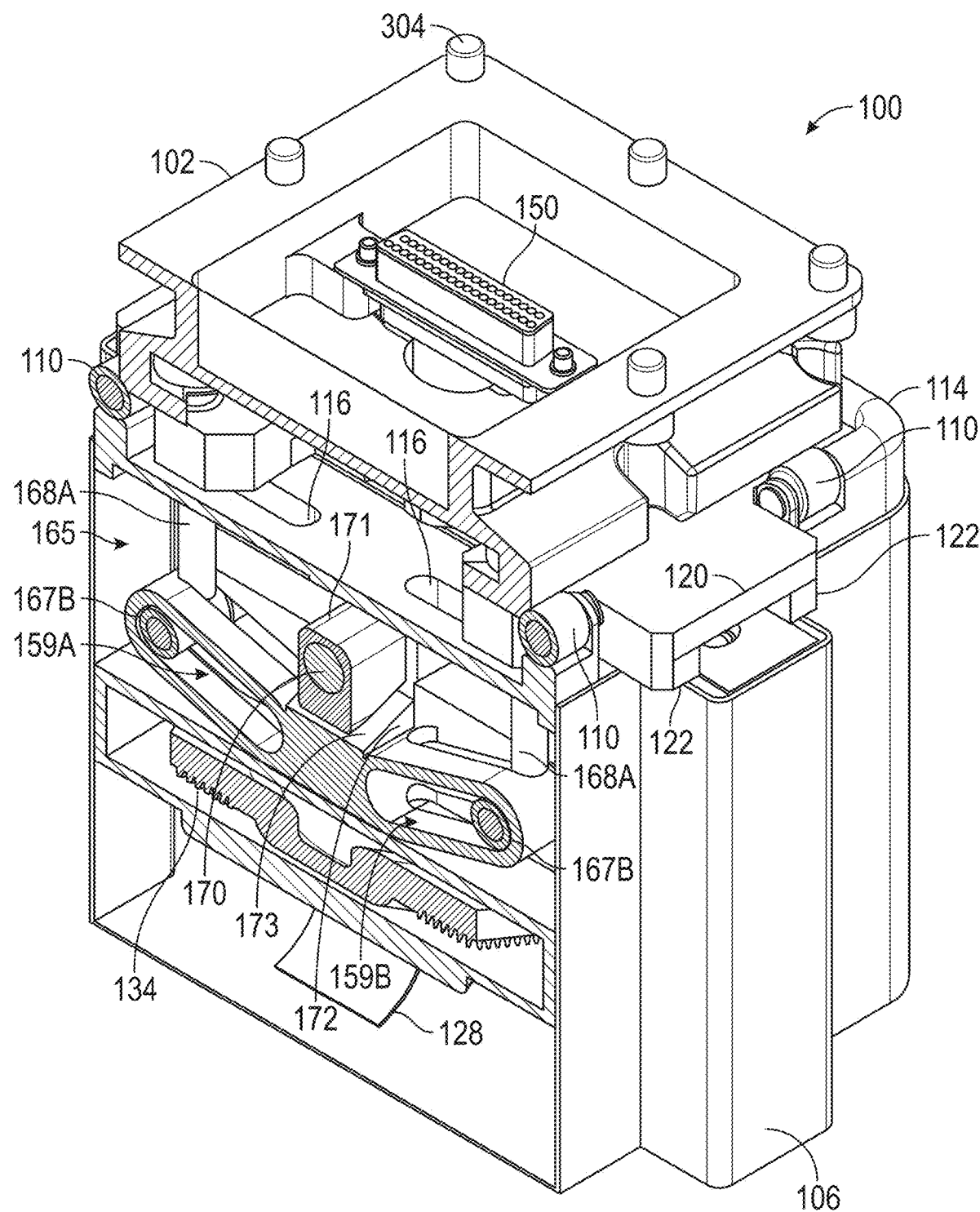
FIG. 1H is another perspective sectional view of the system of FIG. 1A.
Figure 1I:
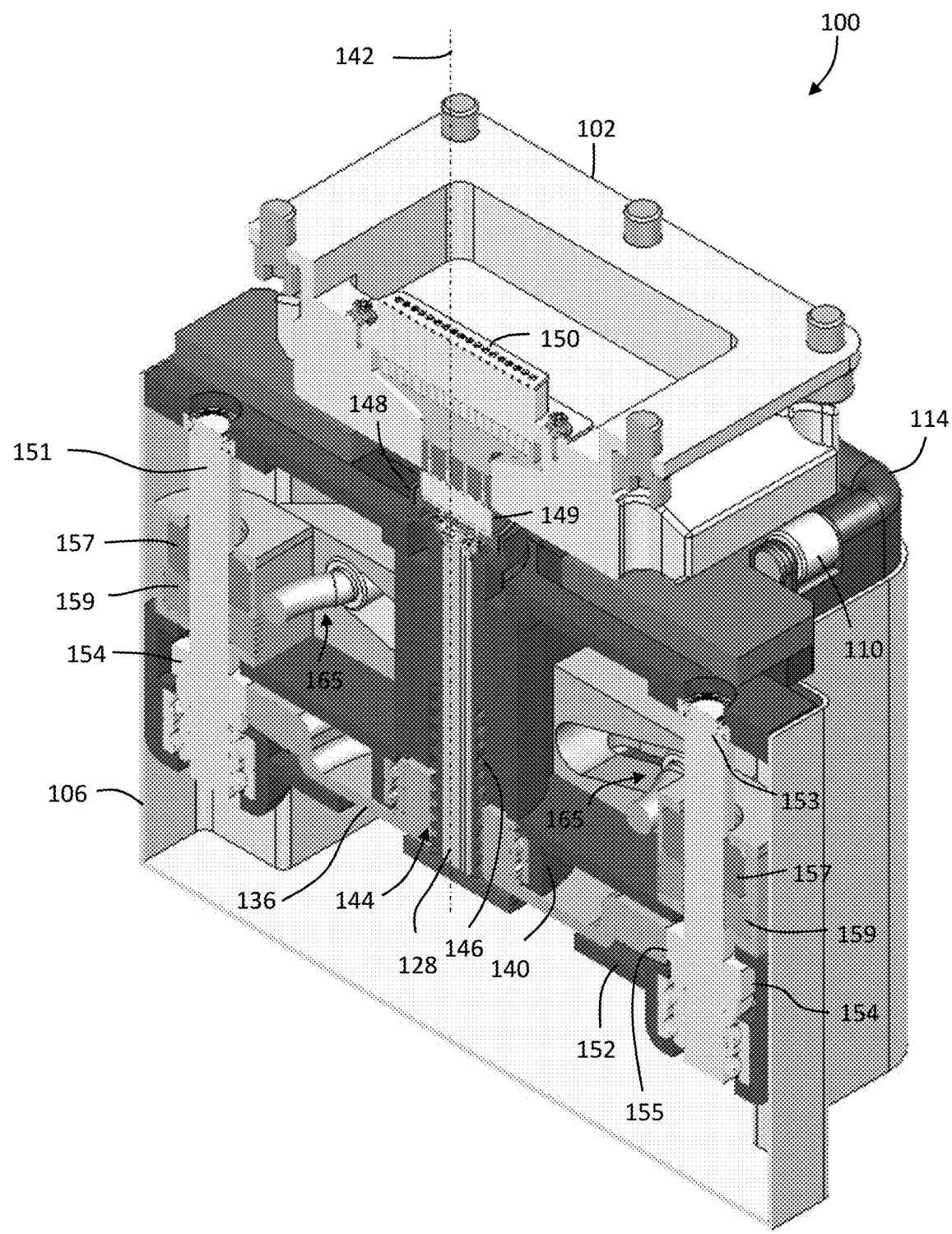
FIG. 1I is another perspective sectional view of the system of FIG. 1A.
Figure 1J:
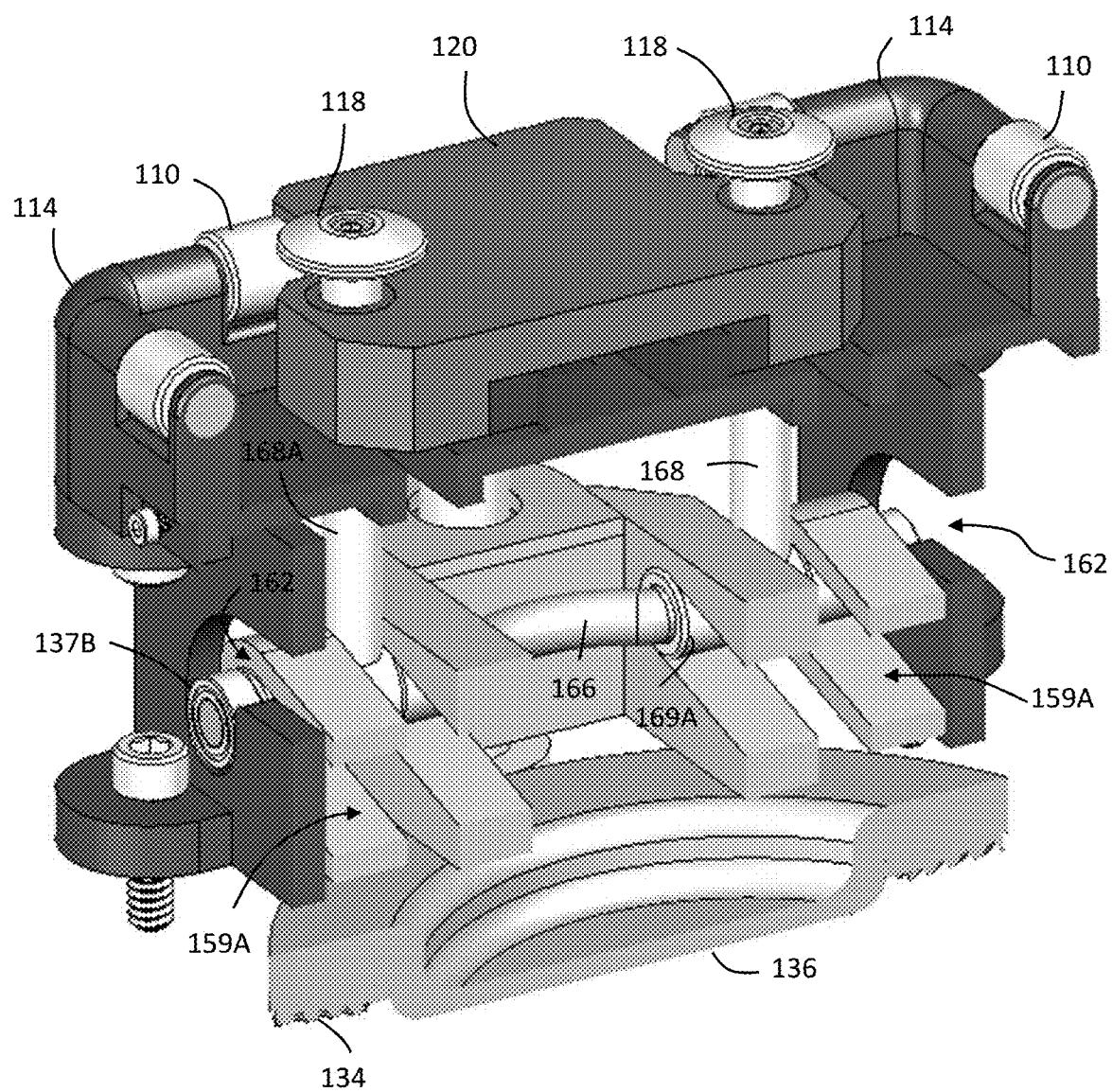
FIG. 1J is a partial sectional view of the cam mechanism of the system of FIG. 1A.

As shown in FIG. 1F, with continuing reference to FIGS. 1A-1J, the actuator 124 is a rotary actuator, such as an electric motor for example, having a pinion gear 132 coupled to its output shaft. The pinion gear 132 engages a gear 134 that is coupled to a cam plate 136. The cam plate 136 rotates about a bearing 138 that is fixed relative to the end plate 108. In an embodiment, the end plate 108 includes a wall 108 that extends into the housing that supports a plate member 140 that the bearing 138 is attached. The bearing 138 defines an axis of rotation 142 for the cam plate 136. The cam plate 136 includes a threaded portion 144 (FIG. 1I). The threaded portion 144 engages a thread on a first lead screw 146. The first lead screw 46 includes a hollow interior that is sized and shaped to receive a portion of the electrical connector 128. In an embodiment, the first lead screw 146 includes an end 148 that supports a plug 149 on the electrical connector 128. As will be discussed in more detail herein, when the actuator 124 is activated, the first lead-screw will be driven along the axis 142 to couple the plug 149 to engage and electrically couple with a corresponding plug 150 on the passive unit 102.

The cam mechanism 126 further includes at least one second lead screw 151. In the exemplary embodiment, there are two second lead screws 151, 153 fixed relative to the housing 106, such as via a plate member 152. In the illustrated embodiment, the lead screws are 180 degrees apart about the axis 142. The lead screws 151, 153 have a gear portion 154 that engages or meshes with a spur-gear teeth 155 on the cam plate 136. The second lead screws 151, 153 are supported by bearings 156 that define an axis of rotation. It should be appreciated that the second lead screws 151, 153 rotate, but do not move translationally relative to the housing 106. Coupled to the second lead screws 151, 153 are a pair of nuts 157. That are captured on a preload or elevator plate 158. The plate 158 float within the housing 106 and is movable along a direction parallel to the axis 142. In an embodiment, the nuts 157 are biased by a biasing member, such as Belville washers 159.

Figure 2A:
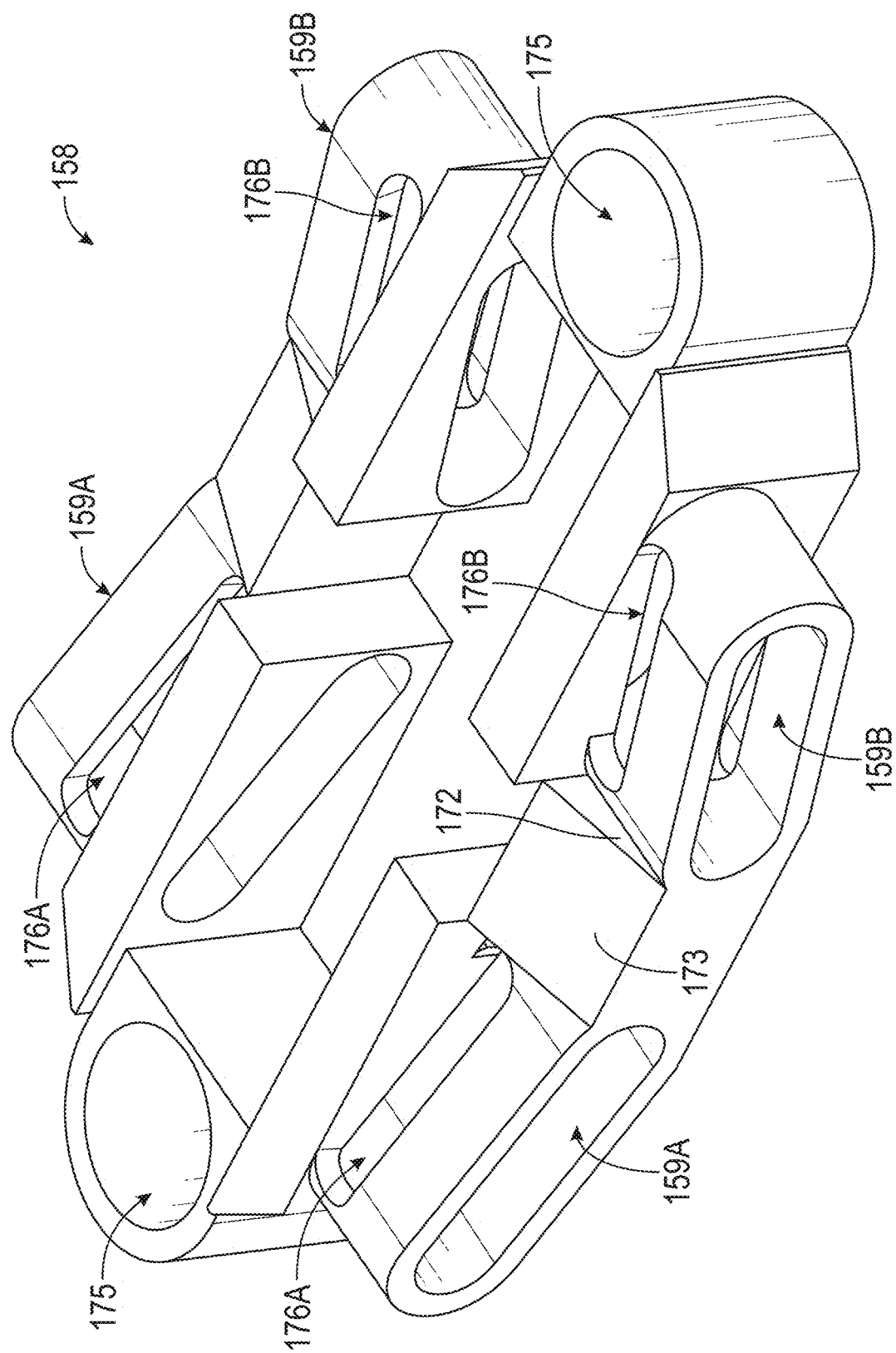
FIG. 2A is a perspective view of a preload plate member of the cam mechanism of the system of FIG. 1A in accordance with an embodiment.

The plate 158 includes at least two slots 159A, 159B. In the embodiment illustrated in FIG. 2A, the plate 158 includes two pairs of slots 159A, 159B. The slots 159A, 159B are disposed on an angle relative to the axis 142. As will be discussed in more detail herein, as the plate 158 moves from a first or stowed position to a second or deployed position the angle of the slots 159A, 159B cause the capture rollers 118 to move the first to the second position.

In an embodiment, the plate 158 further includes a pair of openings 175 that receive lead-screws 151, 153. In further embodiments, the slots 159A, 159B may include a slot or opening 176A, 176B that is transverse to the slots 159A, 159B. The openings 176A, 176B are sized to allow the posts 168A, 168B to extend therethrough and move as the capture rollers 118 are moved between the stowed and deployed positions.

Figure 2B:
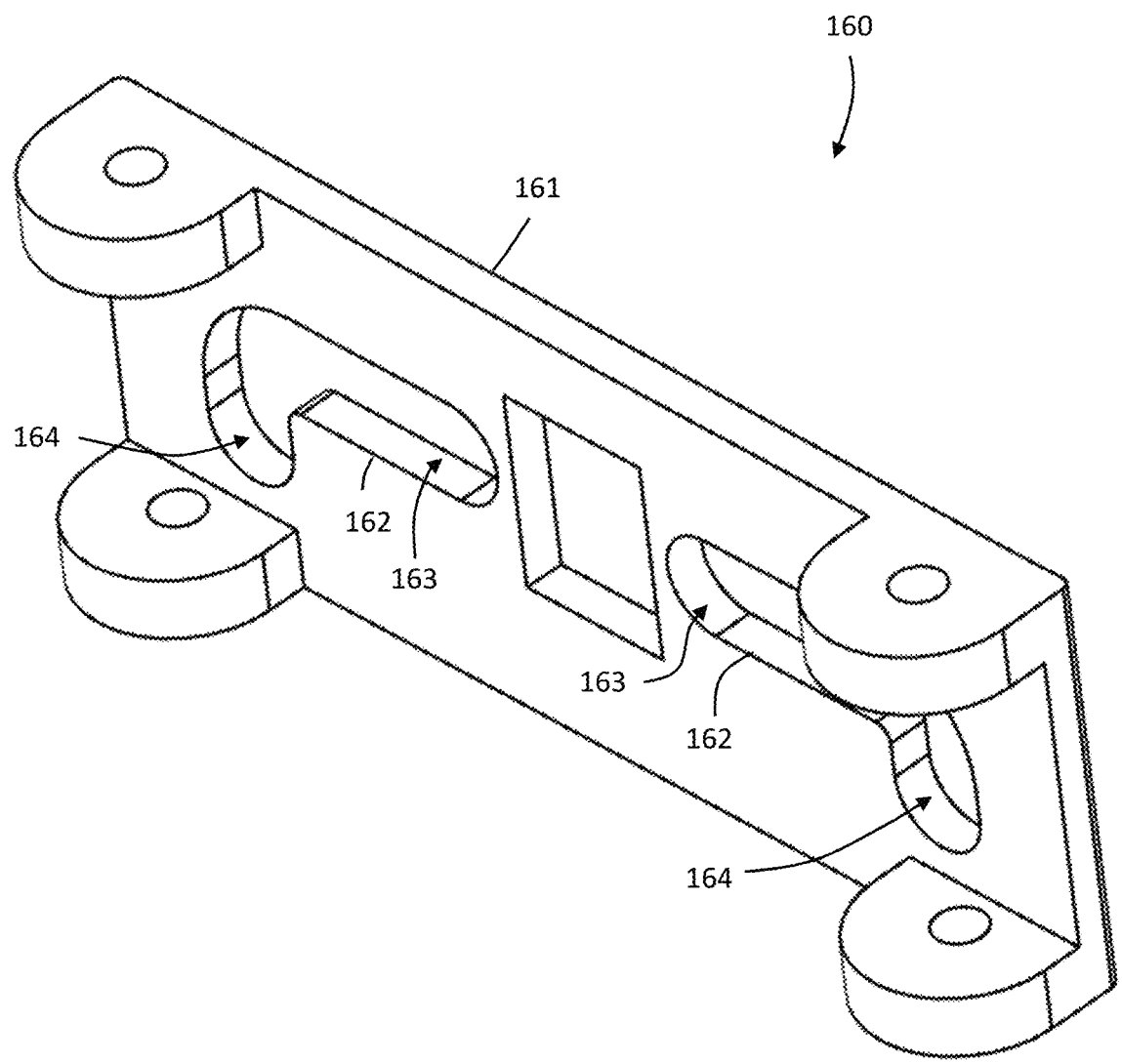
FIG. 2B is a perspective view of a static cam plate member of the cam mechanism of the system of FIG. 1A in accordance with an embodiment.

The cam mechanism 126 further includes a static cam plate 160 that fixedly coupled relative to the housing 106. In the illustrated embodiment the cam mechanism 126 includes a pair of static cam plates 160 disposed on opposing sides of the elevator plate 158. In the embodiment illustrated in FIG. 2B, the static cam plate 160 includes a body portion 161 with a two slots 162 disposed thereon. The slots 162 are a mirror image of each other about a plane centered on and perpendicular to the body 161. In an embodiment, the slots 162 are an L-shape slot having a horizontal portion 163 and a vertical portion 164.

Figure 2C:
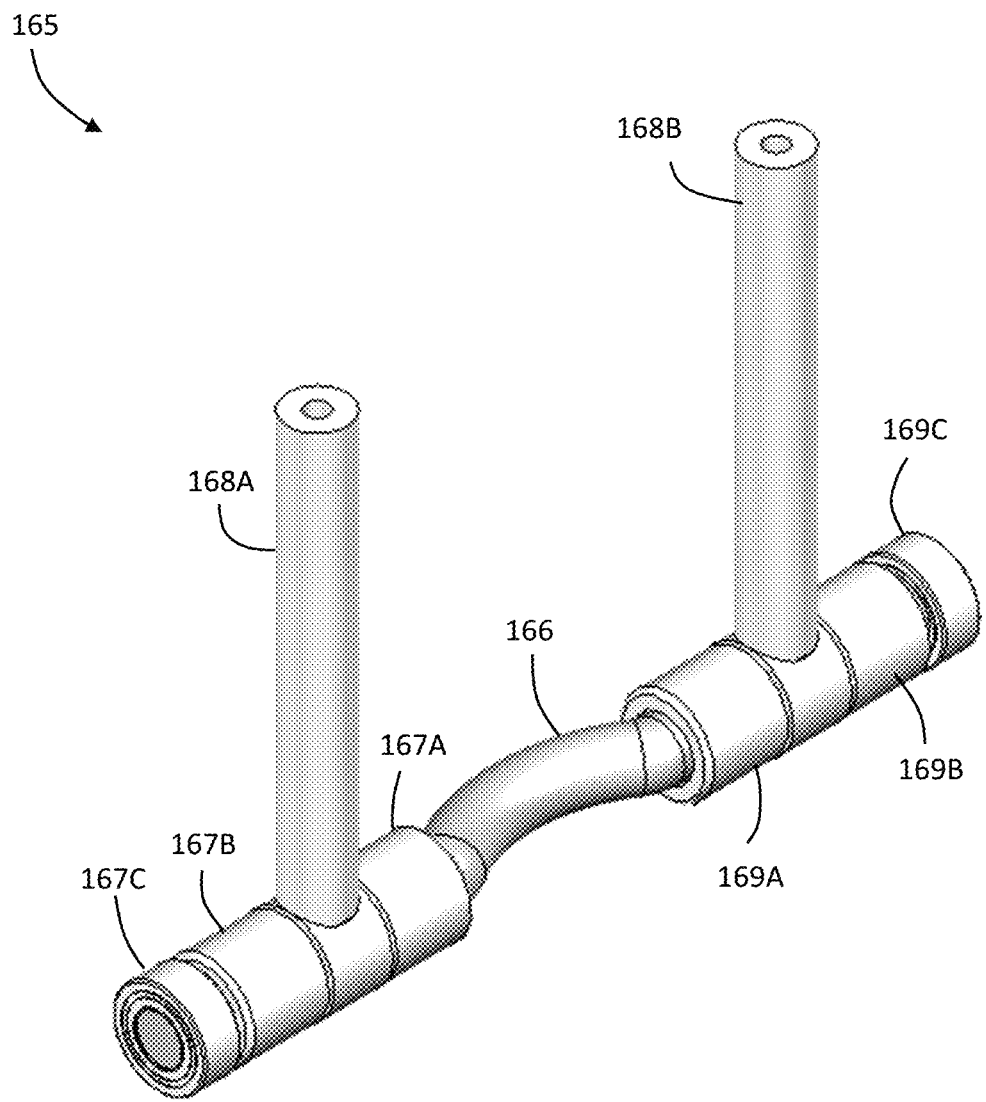
FIG. 2C is a perspective view of a preload cross-shaft assembly in accordance with an embodiment.
Figure 2D:
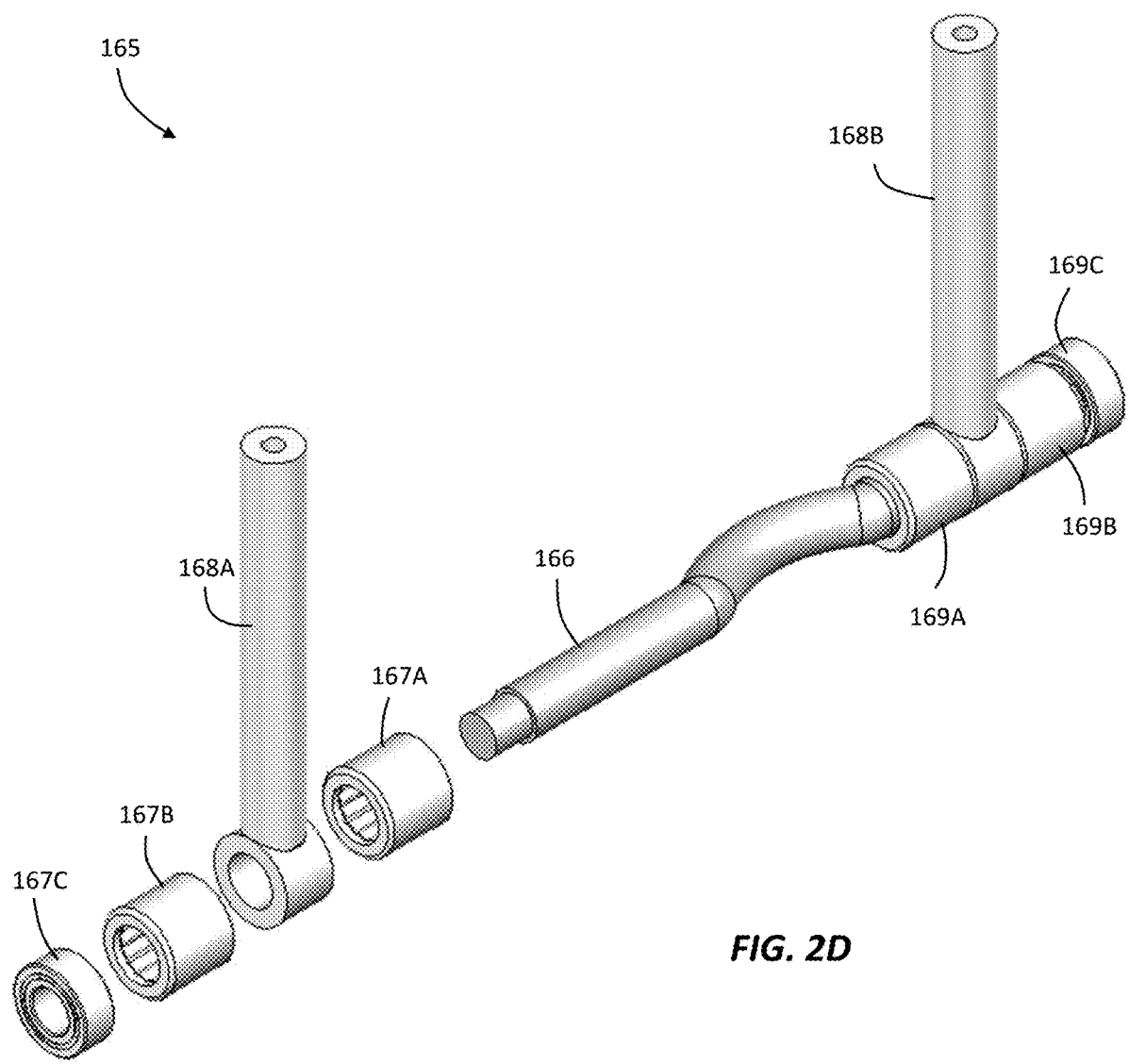
FIG. 2D is a partial unassembled view of the preload cross-shaft assembly of FIG. 2C.

Extending through the slots 159, 162 is a roller assembly 165. As shown in FIG. 2C and FIG. 2D, the roller assembly includes a preload-crossbar 166. A first set of bearings 167A, 167B, 167C and a first post 168A are coupled to one end of the crossbar 166. A second set of bearings 169A, 169B, 169C and a second post 168B are coupled to a second end of the crossbar 166. The crossbar 166 is sized to position the bearings 167A, 167B, 167C, 169A, 169B, 169C within the slots 159, 162. The posts 168A, 168B are sized to extend through the slots 116 in the end plate 108. In the illustrated embodiment the posts 168A, 168B have a threaded hole on the end that allows the capture rollers 118 to couple thereto. In the illustrated embodiment, the cam mechanism 126 includes two roller assemblies, each associated with one of the pairs of capture rollers 118.

Referring back to FIG. 1F, in an embodiment, the system 100 further includes a kinetic fastener 130. The kinetic fastener 130 may be a Frangibolt™ actuator manufactured by TiNi Aerospace, Inc. of San Rafael, California, USA. The kinetic fastener 130 is comprised of a fastener 170 that extends through an actuator 171, a locking wedge 172, and couples to the wall 109 of end plate 108. The locking wedge 172 includes an angled surface 173 that engages and cooperates with a corresponding surface 174 on the elevator plate 158. It should be appreciated that when the fastener 170 is coupled to the wall 109, the locking wedge 172 keeps the elevator plate 158 fixed in its lowest or stowed position. This provides advantages in preventing movement of the cam mechanism 126 during certain aspects of operation, such as during the launching of a satellite for example.

Referring now to FIG. 3A-3D, an embodiment is shown of the passive unit 102. The passive unit 102 includes a flange 300 having a plurality of holes 302 that receive fasteners 304. The fasteners 304 couple the passive unit to the device, vehicle, or extra-terrestrial assembly. The flange 300 defines a recess 306. The recess 306 includes an opening 308 that receives an electrical connector 150 (FIG. 1I).

The passive unit 102 includes a second side 310 opposite the flange 300. The second side 310 includes at least one recess 312. In the illustrated embodiment, the second side 310 includes two recess 312 that are mirror images of each other about a plane that extends the center of the passive unit and is perpendicular to the second side 310. It should be appreciated that while the features of only one of the recesses may be described herein, the other recess includes the same features.

The recess 312 has a generally elongated hexagonal shape. On each end, there is a projection or lip 314 that is formed from a first angled portion 316 and a second angled portion 318. The portions 316, 318 are connected by a semi-circular portion 320. In an embodiment, the semi-circular portion 320 has a diameter sized to receive the post 168A, 168B. The lip 314 extends from a sidewall of the recess a sufficient distance to allow the engagement surface 500 (FIG. 5A) of the capture rollers 118 to substantially overlap the lip when the active portion 102 is docked to the active portion 104.

Figure 3A:
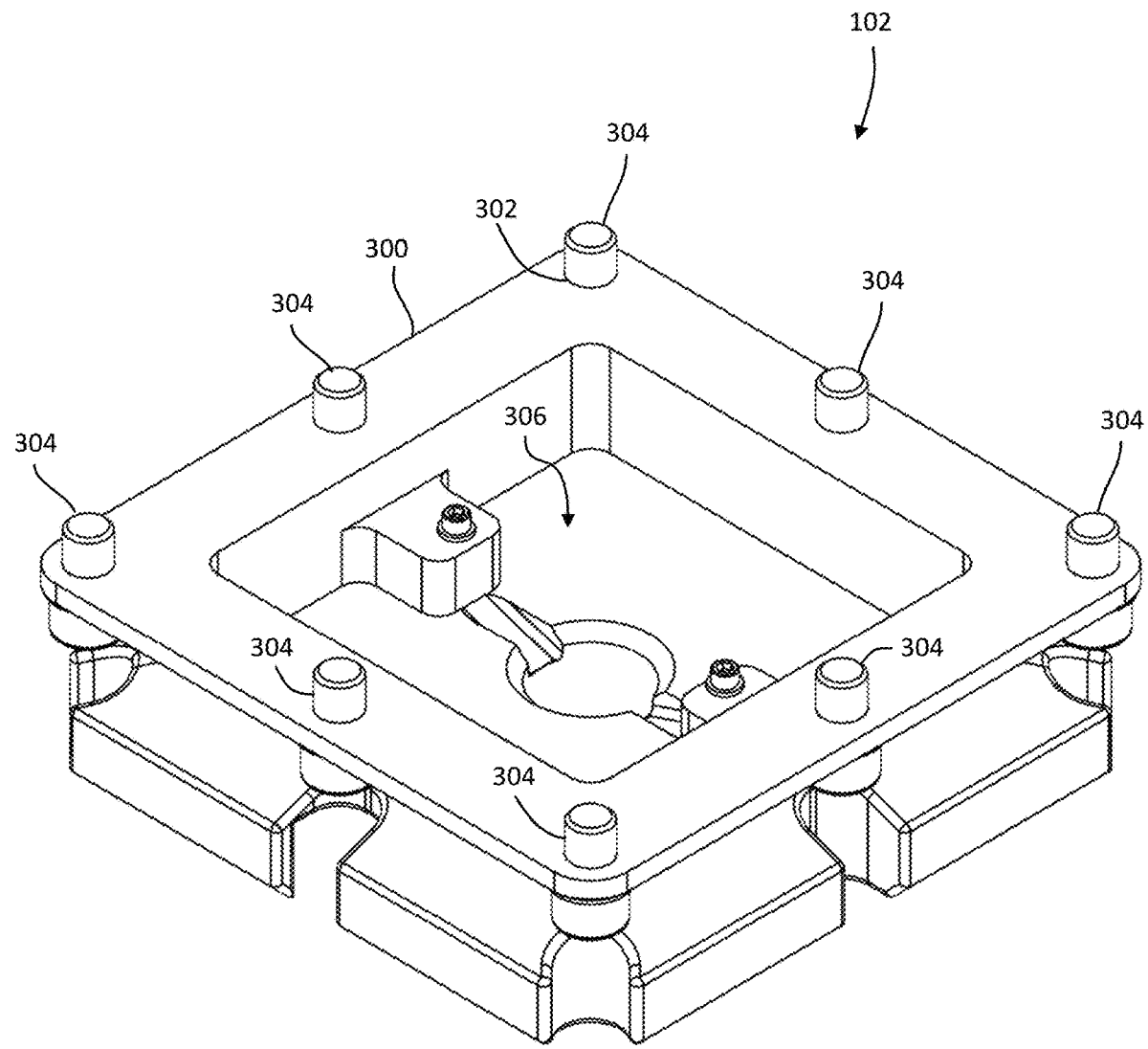
FIG. 3A is a top perspective view of the passive member of the system of FIG. 1A
Figure 3B:
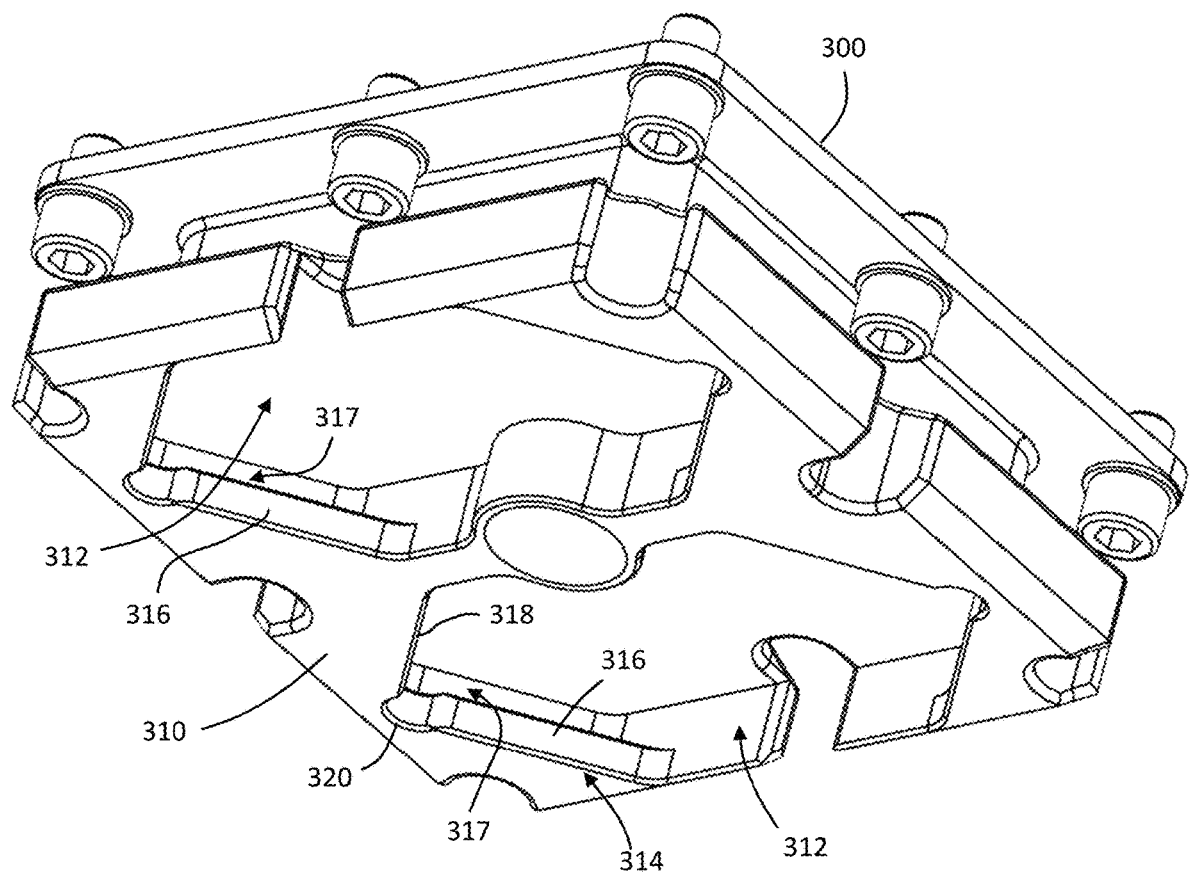
FIG. 3B is a bottom perspective view of the passive member of the system of FIG. 1A.
Figure 3C:
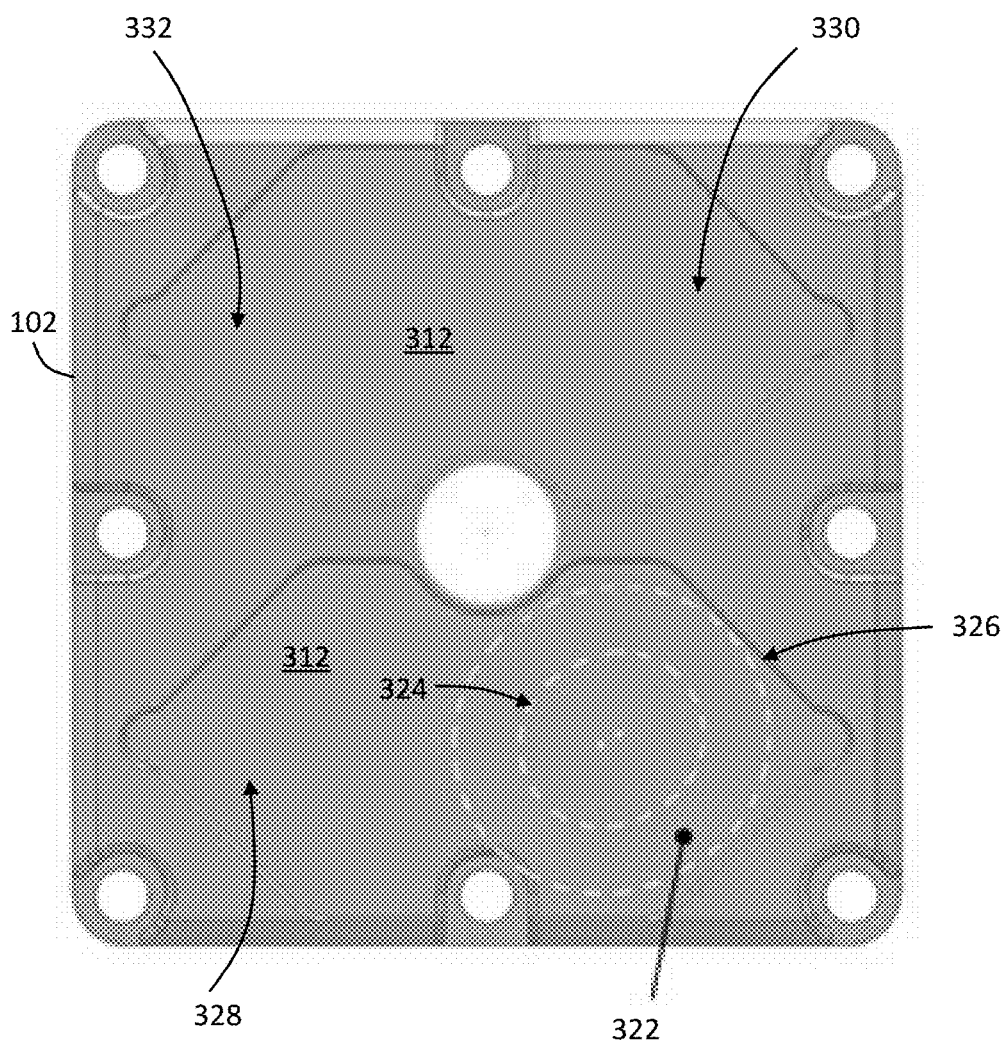
FIG. 3C is a bottom view of the passive member of FIG. 1A.
Figure 3D:
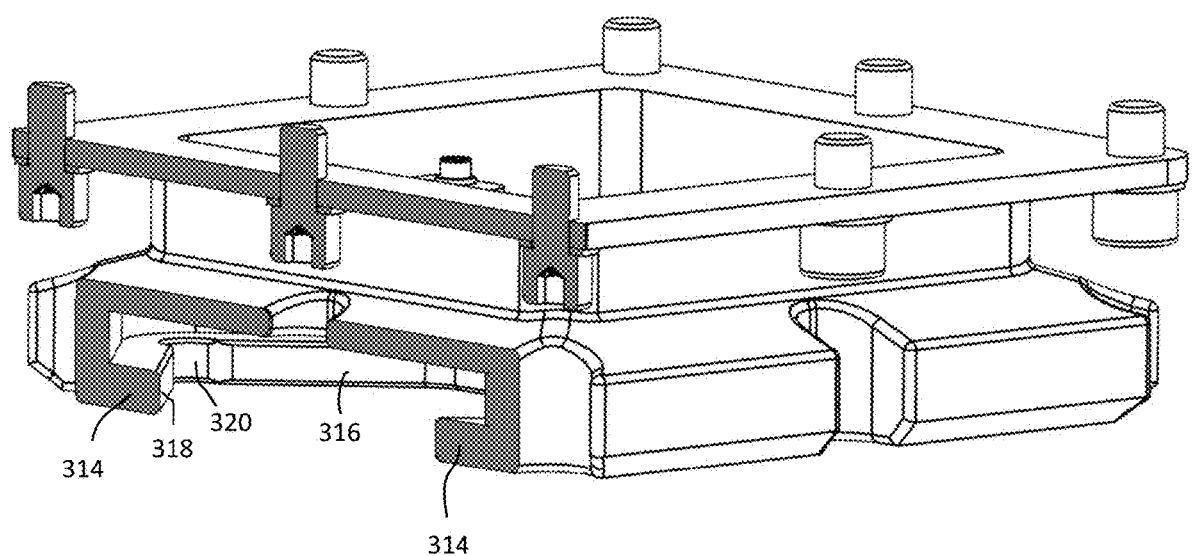
FIG. 3D is a top perspective sectional view of the passive member of FIG. 1A.

The recess 312 is sized to define an entry envelope 322 as illustrated by the dashed lines in FIG. 3C. The inner ellipsoidal dashed line 324 defines the area or range of entry positions of the post 168A, 168B and the outer ellipsoidal dashed line 326 defines the area or range of entry positions of the outer diameter of the capture roller 118. It should be appreciated that provided that the post/capture-roller enters the recess 312 within these areas, the passive unit 102 may be coupled/docked to the active unit 104. It should be appreciated that there is an entry envelope 322 within each of the other sectors 328, 330, 332

Figure 4A:
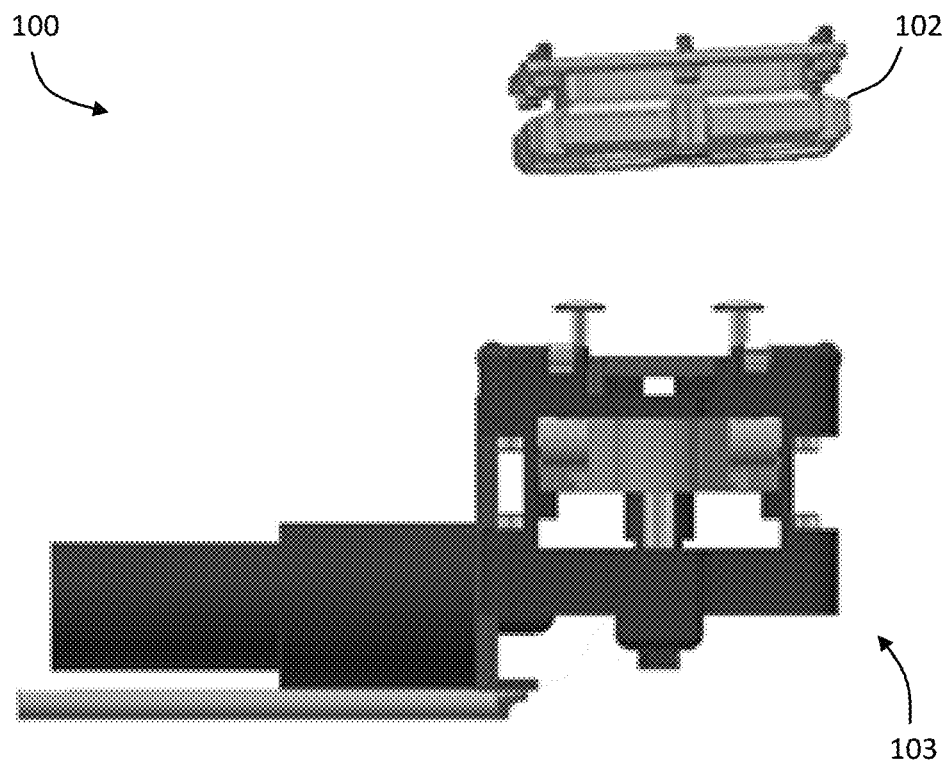
FIG. 4A and FIG. 4B are plan views of the system of FIG. 1A in the process of docking.
Figure 4B:
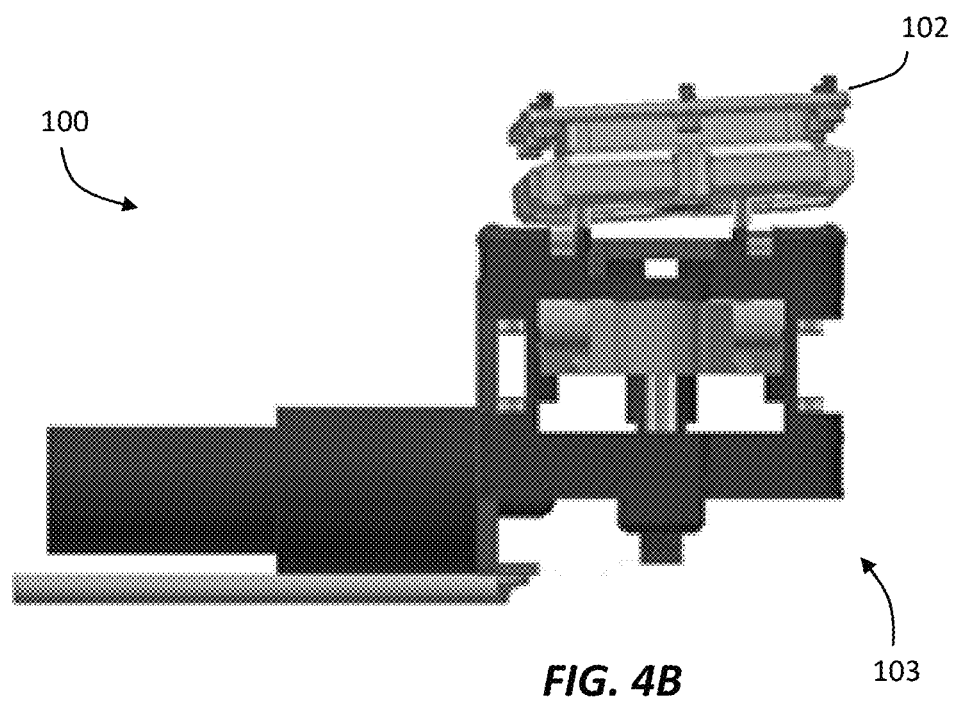

It should be appreciated that as the passive unit 102 is moved towards the active unit 104, the pose or orientation, and position may not be aligned as shown in FIG. 4A. As a result, when the capture rollers 118 enter the recess 312 (FIG. 4B), the passive unit 102 may be offset and/or angled relative to the end plate 108. However, as shown in FIG. 5A-5E, this offset or misalignment may be corrected to allow docking of the passive unit 102 to the active unit 106.

Figure 5A:
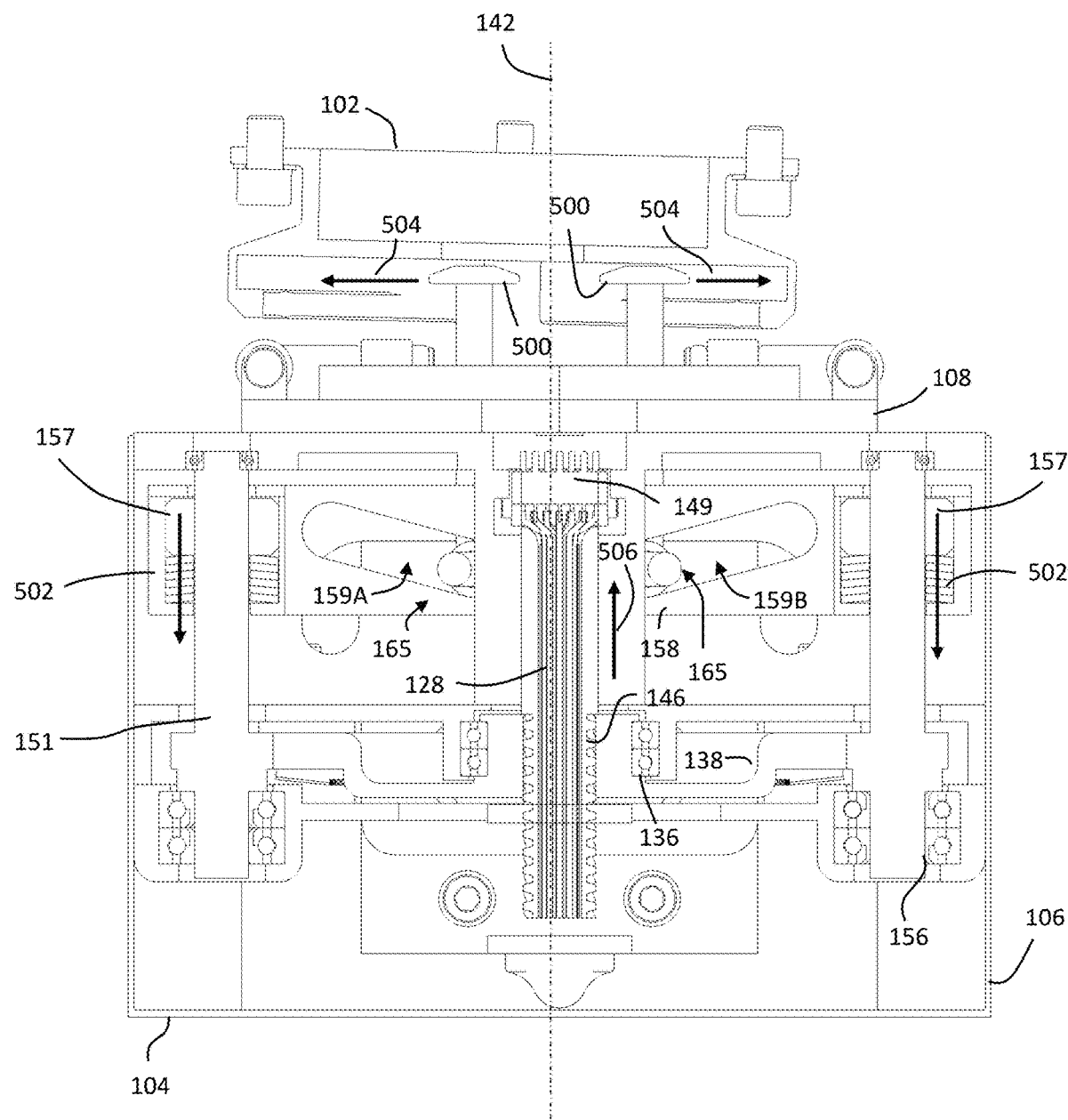
FIG. 5A is a side sectional view of the system of FIG. 1A in an entry position.

As shown in FIG. 5A, when the passive unit 102 approaches the active unit 104, the cam mechanism 126 is in the stowed position with the nut 157 located on an opposite end of the lead screw 151. In the stowed position, the roller assembly 165 is positioned adjacent the axis 142. The plug 149 is arranged within the housing 106 below the end plate 108. As the ground rollers 110 contacts the lower edge/surface of the passive unit 102, the passive unit 102 will shift and center itself relative to the end plate 108. When the passive unit 102 is detected, such as by a proximity sensor (not shown) for example, the actuator 124 activates, causing the second lead screws 151 to rotate and the nuts 157 will translate in a direction along the second lead screws 151 as indicated by the arrows 502.

The translation of the nuts 157 causes the elevator plate 158 to move in the direction of arrow 502. The contact of the angled slots 159A, 159B on the bearings 167A, 167B, 169A, 169B causes the posts 168A, 168B and the capture roller 118 start to translate from the stowed position outward in the direction indicated by the arrows 504. In addition to rotation of the second lead screws 151, the activation of the actuator 124 rotates the first lead screw 146 causing the first lead screw 146 to translate towards the passive unit 102 as indicated by the arrow 506.

Figure 5B:
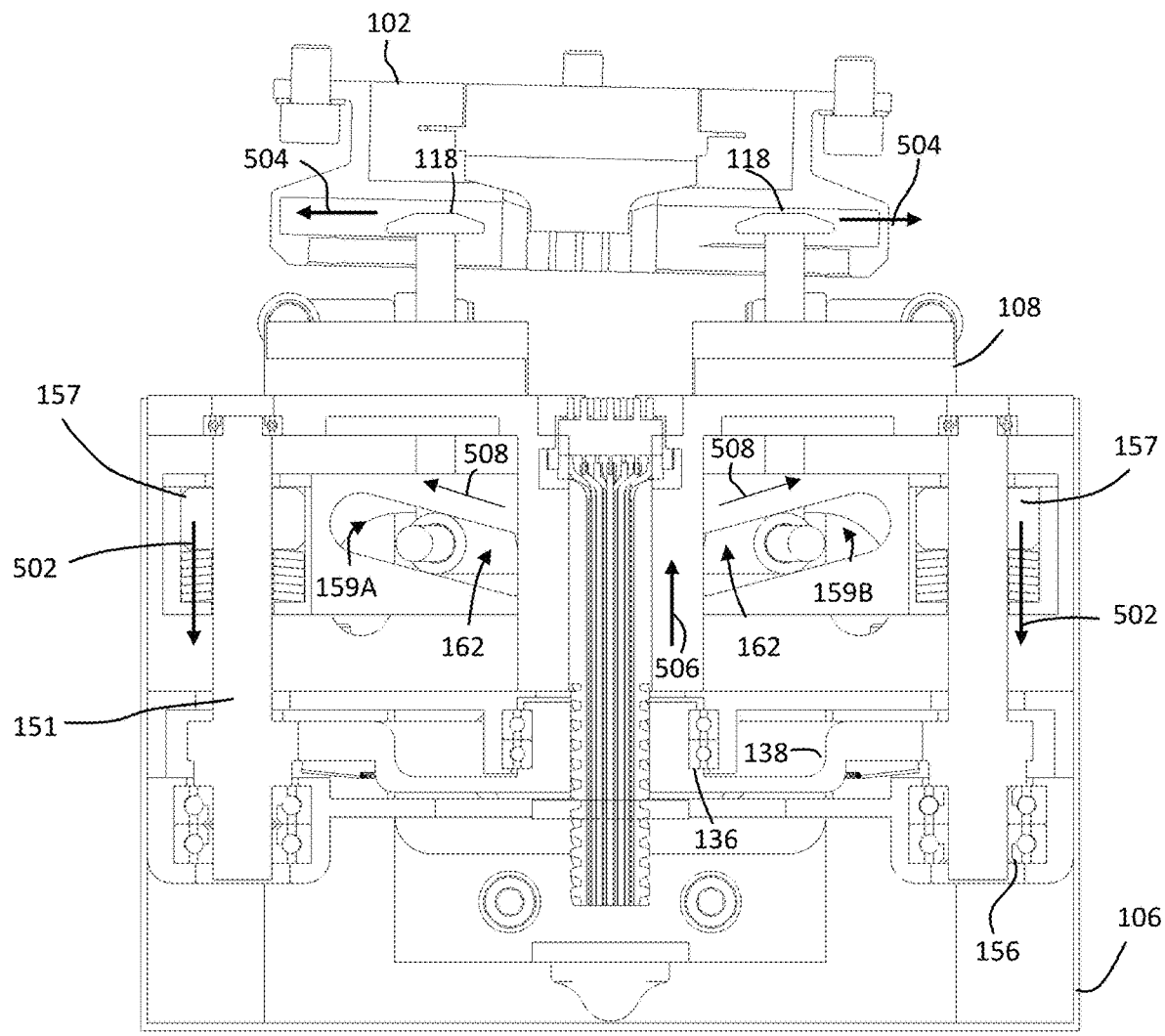
FIG. 5B is a side sectional view with the system of FIG. 1A in a capture envelope position.

As the actuator 124 continues to rotate, the nuts 157 165 continue to move or translate in the directions 502, 504 and roller assembly 165 in the direction indicate of arrows 508 as shown in FIG. 5B. As the roller assembly 165 moves along the slots 159A, 159B, it further moves/translates laterally along the slots 162. Since the slots 162 are parallel with the top surface of the end plate 109, the vertical position (from the viewpoint of FIG. 5B) of the capture rollers 118 remain substantially constant. In other words, the capture rollers 118 move outwardly towards a deployed position but do not substantially move in a direction perpendicular to this direction. As the actuator 124 continues to rotate, the translation of the plug 149 continues towards the end plate 108 and the passive unit 102. It should be appreciated that depending on the position of the passive unit 102 relative to the active unit 104, one or more of the capture rollers 118 may engage the passive unit 102 and move it towards a position centered on the active unit.

As the actuator 124 continues to rotate, the roller assembly 165 will continue to translate in the direction of arrows 508 until the roller assembly 165 reaches the end 510 (FIG. 5C) of the slots 159A, 159B. It should be appreciated that this position coincides with the transition between the slot portions 163, 164 (FIG. 2B) of slot 162. It should be appreciated that if the capture roller 118 enters the recess 312 within the capture envelope 322, by the point that the roller assembly 165 reaches the end 510, the surface 500 of the capture rollers 118 will be disposed in the slot 317 defined by the lip 316. This is sometimes referred to as a soft dock position.

Figure 5C:
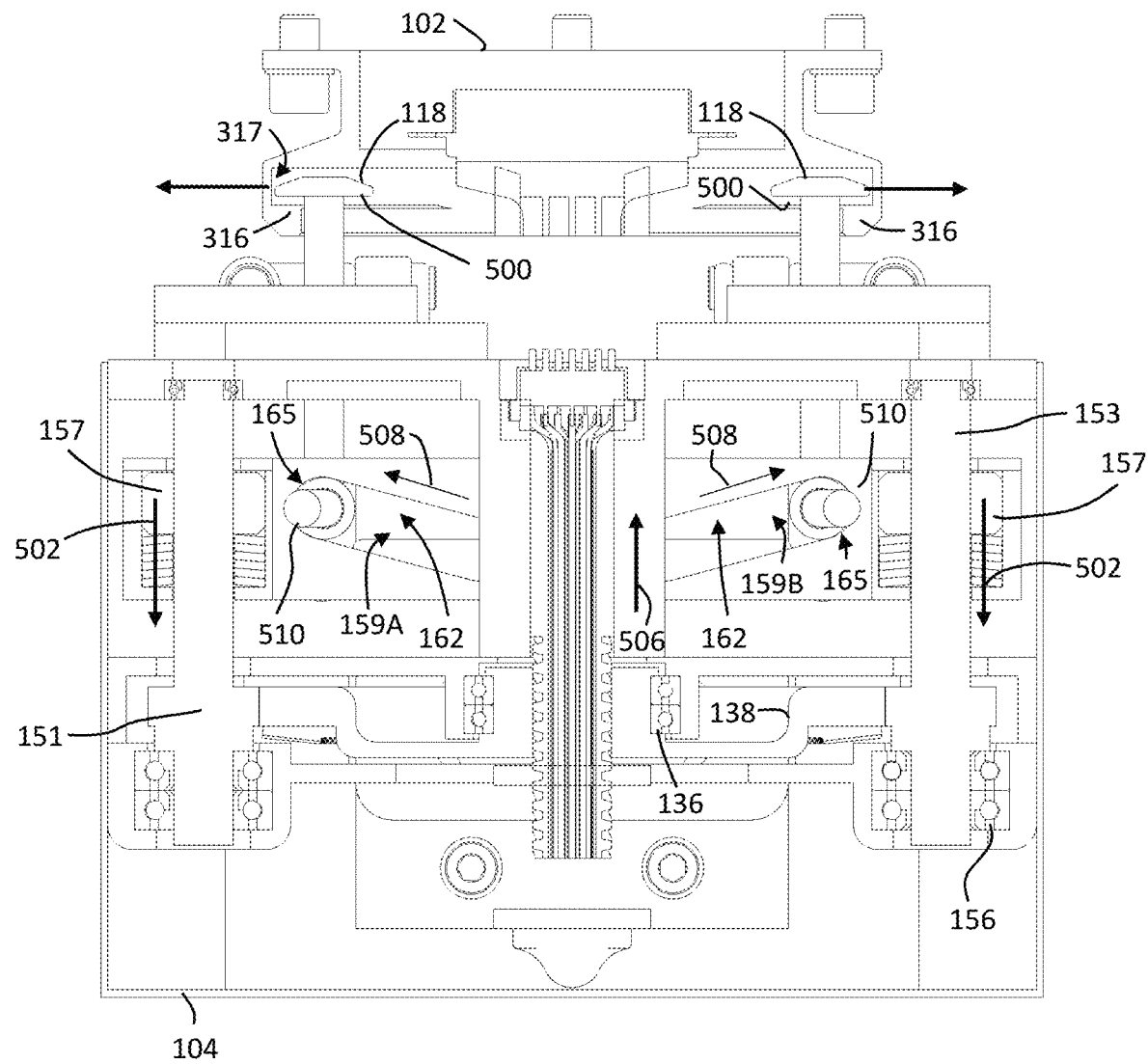
FIG. 5C is a side sectional view with the system of FIG. 1A a lock-soft dock position.
Figure 5D:
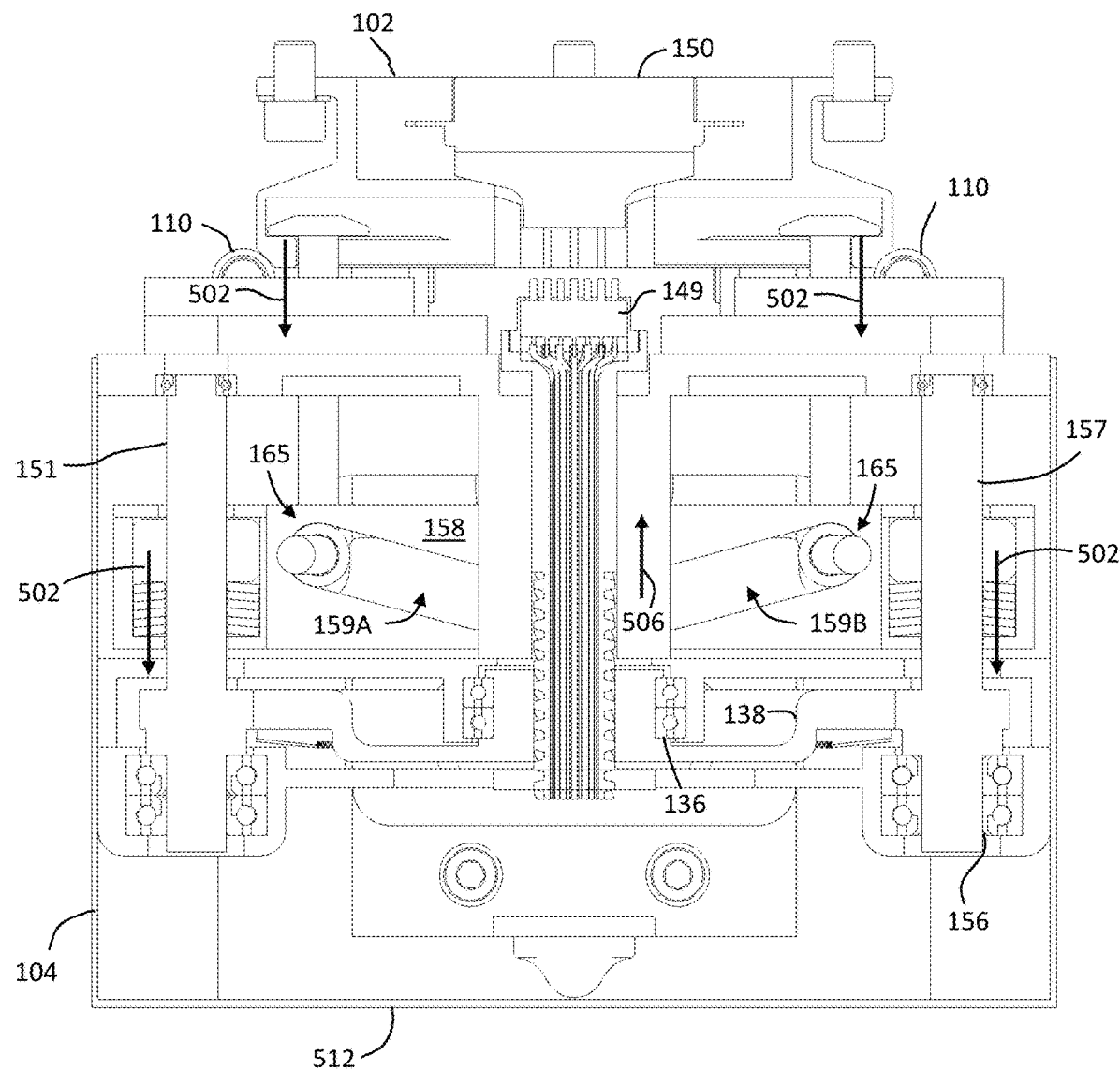
FIG. 5D is a side sectional view with the system of FIG. 1A in a lock-hard dock position.
Figure 5E:
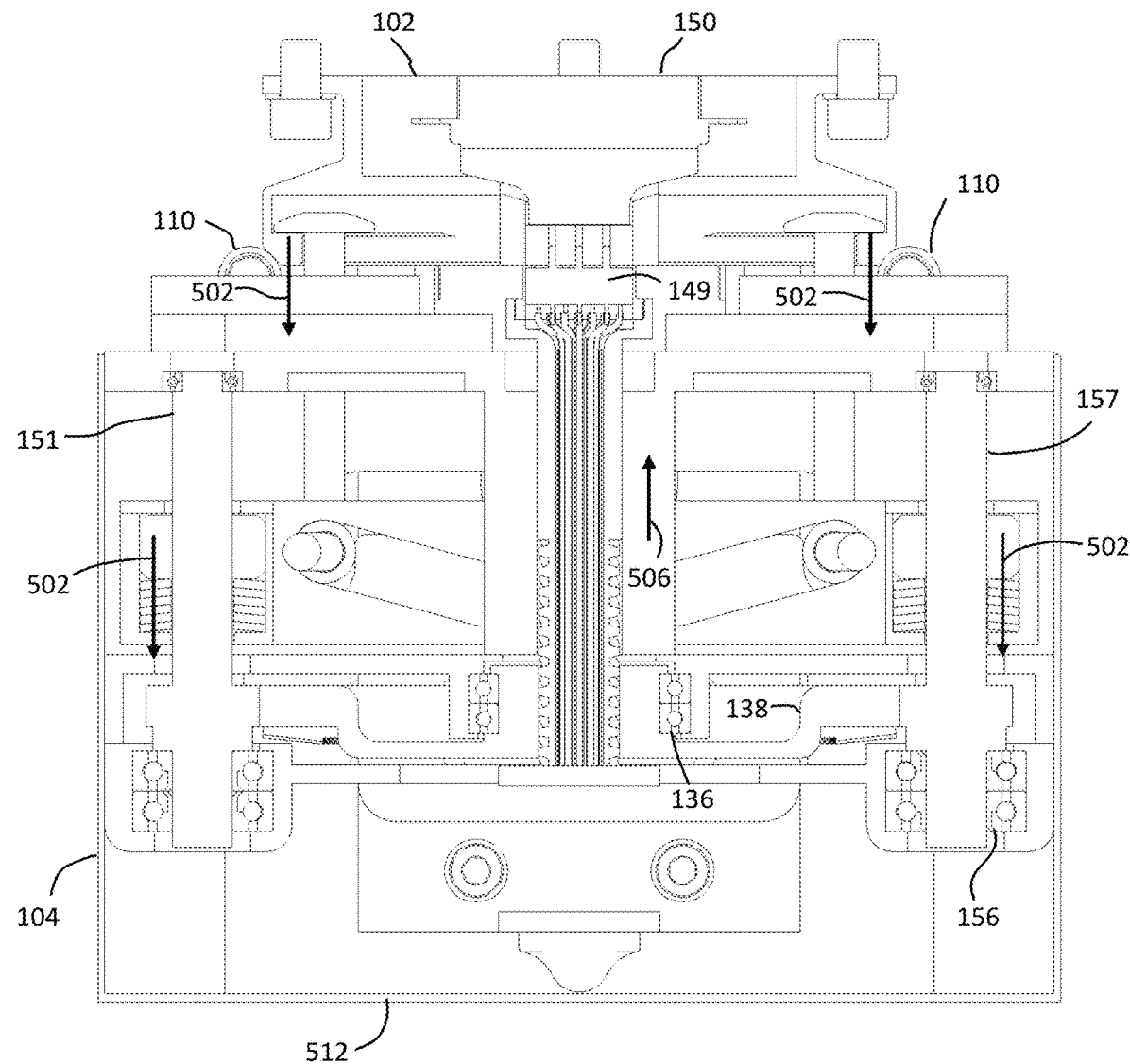
FIG. 5E is a side sectional view of the system of FIG. 1A in an engage electrical connection position.

Further continued rotation of the actuator 124 as shown in FIG. 5D causes the roller assembly 165 to move/translate along the slot portions 164 of slot 163. This causes the roller assembly 165 and the capture rollers 118 to move/translate towards the bottom 512 of the housing 106 (e.g. parallel to the direction of arrows 502). This motion pulls the passive unit 102 towards the end plate 108. During this motion, the electrical connector 128 and the plug 149 continue to move towards the passive unit 102. The motion of the roller assembly 165, capture bearings 118, and passive unit 102 continue until the passive unit 102 contacts the ground rollers 110 and the plug 149 engages and electrically couples to the plug 150 (FIG. 5E). At this point, the actuator 124 stops rotating stopping the movement of the roller assembly 165 and the plug 149 prior to the roller assembly 165 contacting the end of the slot portion 164 of slot 163. This is sometimes referred to as a hard dock position.

In an embodiment, the roller assembly 165 motion continues for a short time period after the passive unit 102 contacts the ground rollers 110. This causes the biasing member 159 compress and provide a desired level of preload on the connection between the surface 500 and the lip 316. This additional motion/travel also allows the plug 149 to engage and connect to the plug 150 with the passive unit in the desired pose and position.

It should be appreciated that the active unit 104 may include sensors, such as proximity sensors, hall effect sensors, contact switches, or limit switches (not shown) for example, that cooperate with the actuator 124 to start and stop the motion of the roller assembly 165 and plug 149.

Figure 6A:
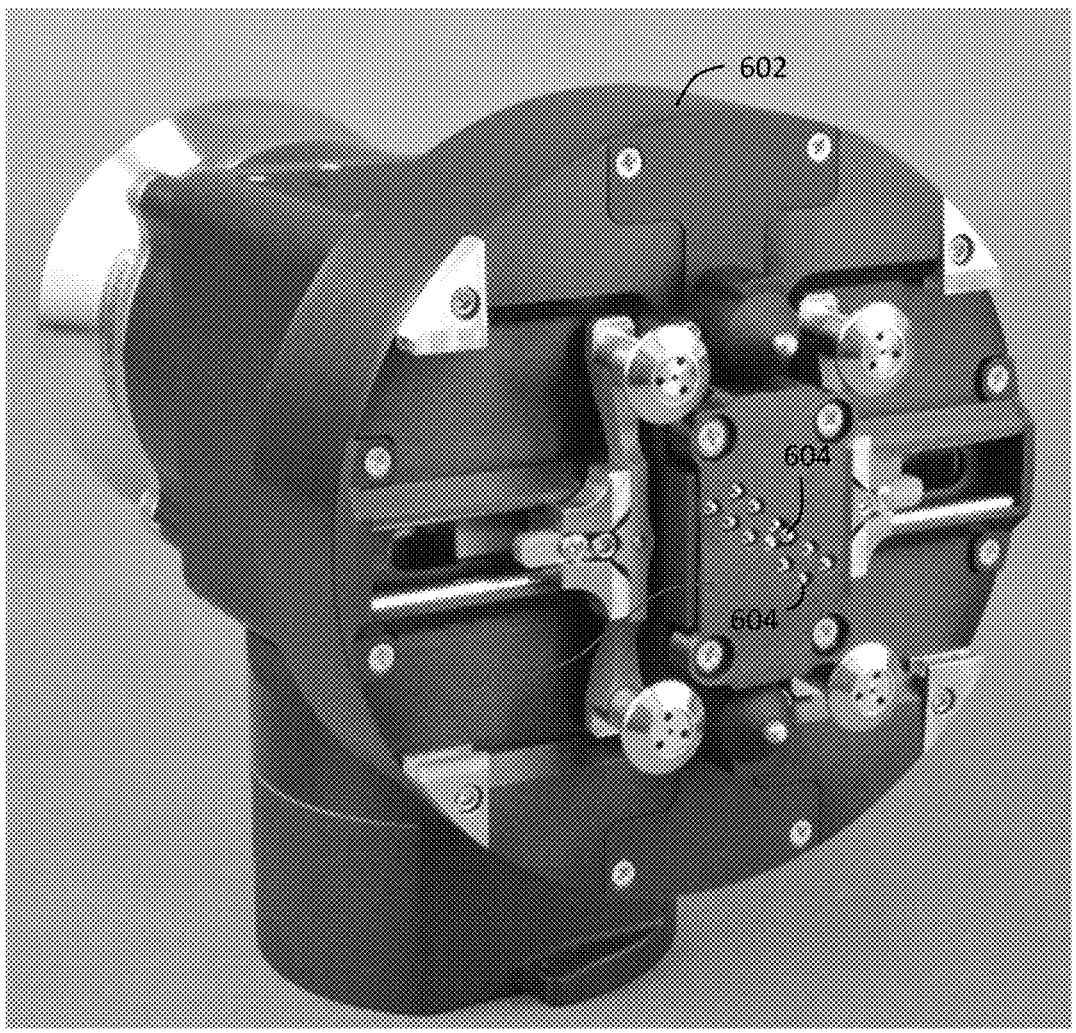
FIG. 6A is perspective view of the system of FIG. 1A having an electrical feed-though pin connector.
Figure 6B:
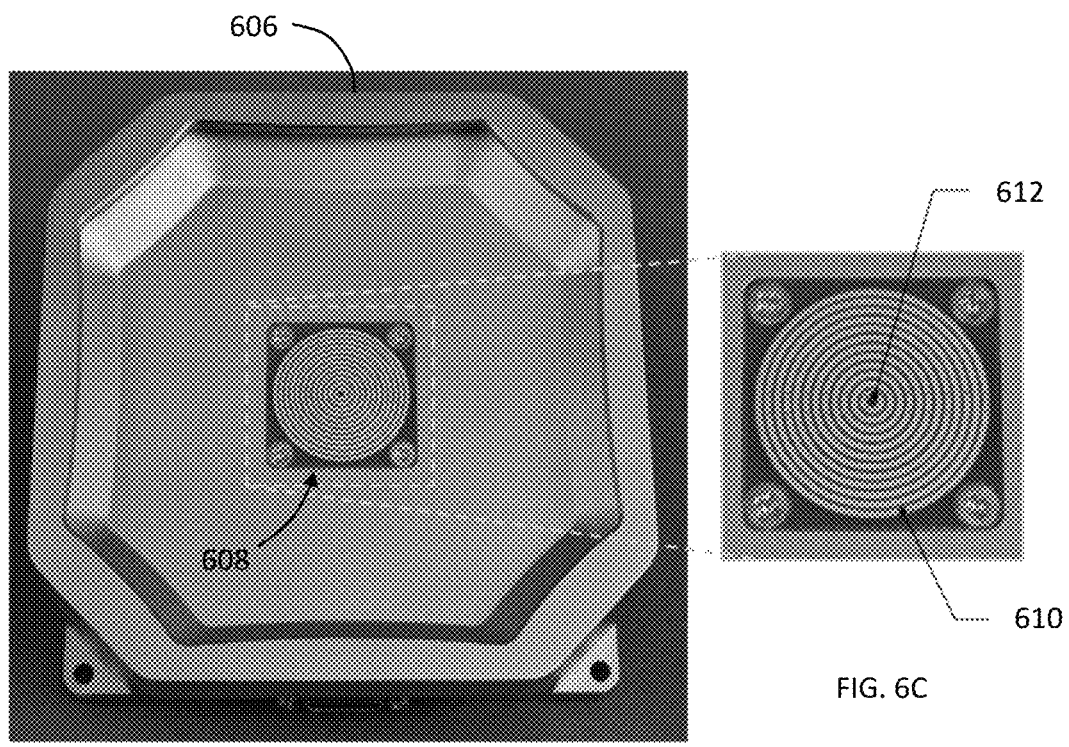
FIG. 6B is a perspective view of the passive unit of FIG. 6A.

It should be appreciated that while embodiments of FIGS. 1A-5D illustrate the plugs, 149, 150 as being linear electrical connectors, this is for example purposes and the claimed invention should not be so limited. In other embodiments, other types of electrical connections may be used. For example, as shown in FIG. 6A-6C, a pin connector 600 is positioned on the active unit 602. The connector 600 includes a plurality of spring loaded pins 604 that are arranged in pairs, such that each pair is at a different radius from the center of the active unit. On the passive unit 606 there is a connector 608, sometimes referred to as a bullseye connector, that consists of a plurality of concentric traces or rings, such as outer trace 610 and inner trace 612. Each of the concentric traces is sized to electrically connect with one of the pairs of pins 604. In an embodiment, the connector 600 is fixed to the end plate 108 with the pins 604 having sufficient travel to accommodate the preload travel of the passive unit 606 to the active unit 602. In another embodiment, the connector 600 translates through the active unit 602 in a similar manner to plug 149.

It should be appreciated that the passive unit 102 may be decoupled from the active unit 104 by reversing the process described in reference to FIGS. 5A-5D.

Figure 7:
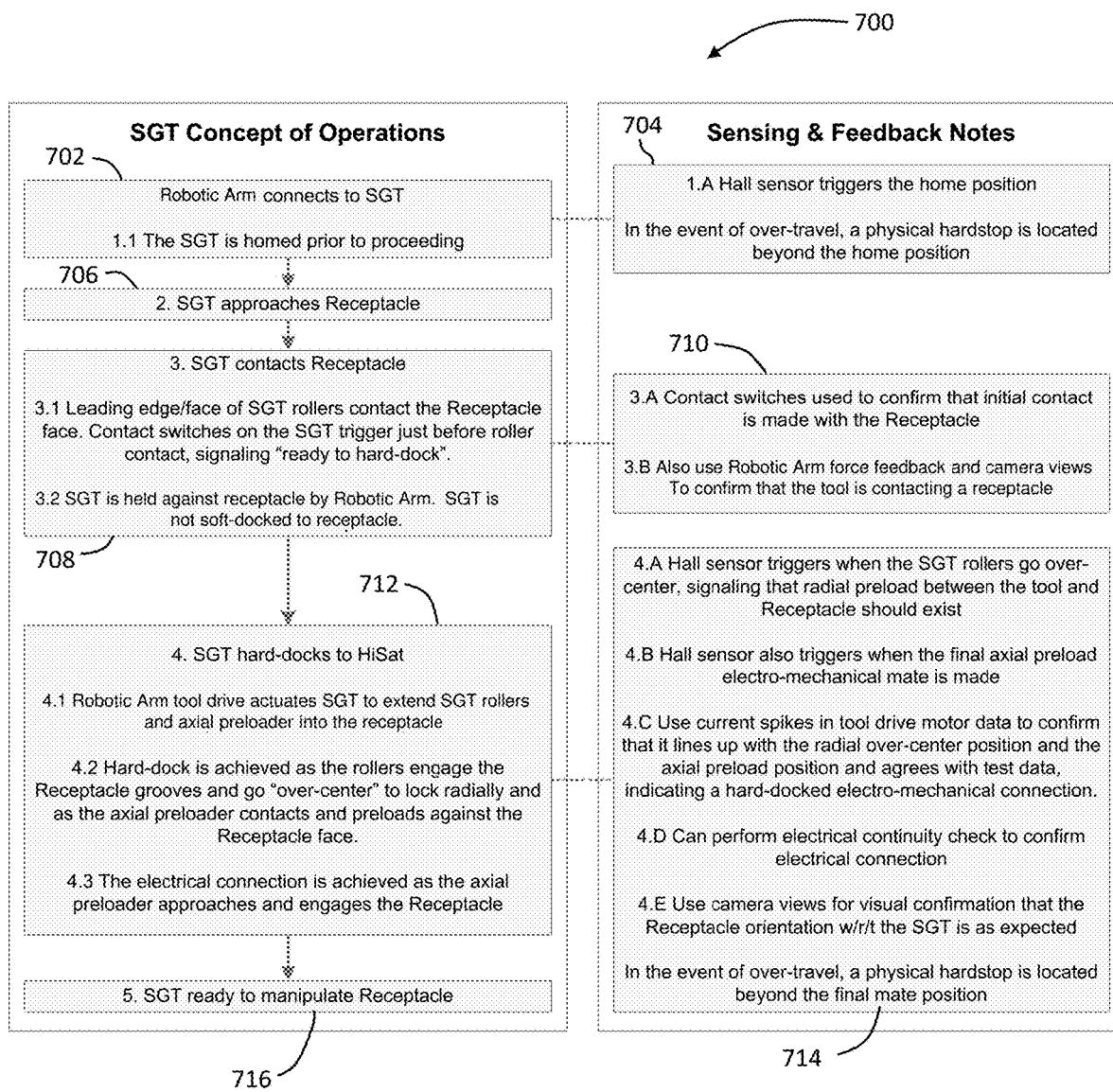
FIG. 7 is a flow diagram of the operation of the system of FIG. 1A.

Referring now to FIG. 7, a method 700 is shown for using the coupling system 100 to couple two extraterrestrial vehicles (not shown), such as a repair vehicle and a satellite for example. The method 700 begins in block 702 with a controller connecting to the active unit 102. In an embodiment sensors, such as hall effect sensors for example, trigger in block 704 the actuator 124 to move the capture rollers 118 to move to the home or stowed position (FIG. 5A). The method 700 then proceeds to block 706 where the passive unit 102 approaches the active unit 104 (FIG. 4A). The method 700 then proceeds to block 708 where the passive unit 102 contacts the active unit 104. In this block, the leading edge of the ground rollers 110 contact the passive unit 102 (FIGS. 5B-5C). In an embodiment, contact switches on the active unit activate prior to roller contact. In an embodiment, contact switches are used to confirm that initial contact is made between the active unit 104 and the passive unit 102 in block 710. In further embodiments, force feedback signals from the actuator 124 and visual images (e.g video camera) may be used to confirm contact.

The method 700 then proceeds to block 712 where the actuator 124 continues to move the roller assembly 165 to engage the lip 316 and preload the passive unit 102 relative to the active unit 104 by translating the contract rollers 118 in the direction of arrow 502. A hard-dock condition (FIG. 5E) is achieved when the ground rollers 110 engage the passive unit and rotate over-center to lock radially as the preloading movement is performed. The electrical connection between the plug 149 and the plug 150 is completed to complete the hard-dock of the passive unit 102 to the active unit 104. In an embodiment, in block 714 a sensor, such as a hall effect sensor for example, activates when the ground rollers 110 go over-center to indicate that the preload motion is initiated. The sensor further activates when the desired amount of axial preload is achieved. In an embodiment, a current spike from the actuator 124 confirms the over-center condition and preload position. Electrical continuity may be performed between the plugs, 149, 150. Further visual confirmation may be performed using external cameras.

The method 700 then proceeds to block 716 where the active unit 104 may be used to hold or perform additional operations on the satellite attached to the passive unit 102.

The term "about" is intended to include the degree of error associated with measurement of the particular quantity based upon the equipment available at the time of filing the application.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection." It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A coupling system comprising:
   a passive unit having a first side and an opposing second side, the first side having a recess with a lip; and
   an active unit comprising:
     an actuator;
     a cam mechanism operably coupled to the actuator, the cam mechanism being movable from a stowed position to a deployed position; and
     a plurality of capture rollers operably coupled to the cam mechanism to move from a first position to a second position in response to the cam mechanism moving from the stowed position to the deployed position, the plurality of capture rollers engaging the recess to align the passive unit as the plurality of capture rollers move from the first position and second position engaging the lip in the second position and moving the passive unit into contact with the active unit.

2. The coupling system of claim 1, further comprising a launch lock device operably coupled to lock the cam mechanism in the stowed position when in an unactuated configuration.

3. The coupling system of claim 2, wherein the launch lock disengages from the cam mechanism when in an actuated configuration.

4. The coupling system of claim 1, wherein the plurality of capture rollers and the passive unit are configured to allow engagement of the capture rollers with the lip when the passive unit is positioned within a capture envelope.

5. A coupling system comprising:
   a passive unit having a first side and an opposing second side, the first side having a recess with a lip; and
   an active unit comprising:
     an actuator;
     a cam mechanism operably coupled to the actuator, the cam mechanism being movable from a stowed position to a deployed position, the cam mechanism comprising:
       a gear operably coupled to the actuator,
       at least one first lead-screw operably coupled to the gear,
       an elevator plate operably and movably coupled to the at least one lead-screw, the elevator plate having at least one first cam slot, and
       at least one roller assembly operably and movably coupled to the at least one first cam slot, the at least one roller assembly being movable from an entry position to a docked position in response to activation of the actuator, the plurality of capture rollers being coupled to the at least one roller assembly; and
     plurality of capture rollers operably coupled to the cam mechanism to move from a first position to a second position in response to the cam mechanism moving from the stowed position to the deployed position, the plurality of capture rollers engaging the lip in the second position when the passive unit is in contact with the active unit.

6. The coupling system of claim 5, wherein the cam mechanism further comprises a static cam plate having at least one second cam slot, the at least one roller assembly being operably coupled to the at least one second cam slot.

7. The coupling assembly of claim 6, wherein the at least one roller assembly includes a preload cross-shaft, the preload cross-shaft being operably and movably coupled to the at least one first cam slot and the at least one second cam slot, the preload cross-shaft cooperates with the at least one first cam slot to move the plurality of rollers in a first direction and cooperates with the at least one second cam slot to move the plurality of rollers in a second direction, the plurality of capture rollers being positioned to engage the passive unit when in the docked position.

8. The coupling assembly of claim 5, wherein the cam assembly further comprises a central lead screw movably coupled to the gear to move from a retracted position to a connected position as the cam mechanism moved from a stowed position to a deployed position.

9. The coupling assembly of claim 8, wherein the movement of the central lead screw from the retracted position to the connected position is co-axial with an axis of rotation of the gear.

10. The coupling assembly of claim 9, further comprising:
a first electrical connector coupled to the central lead screw; and
a second electrical connector coupled to the passive member.

11. The coupling assembly of claim 10, wherein the first electrical connector is coupled to the second electrical connector when the central lead screw is in the connected position and the passive unit is in the docked position.

12. The coupling assembly of claim 1, further comprising:
a housing, the cam mechanism being disposed within the housing, the housing having a recess on one end, the plurality of capture rollers being at least partially disposed within the recess; and
a plurality of ground rollers disposed about the periphery of the recess.

13. The coupling assembly of claim 12, wherein the plurality of capture rollers includes a first pair of capture rollers and a second pair of capture rollers, the first pair of capture rollers being coupled together by a first slide plate and the second pair of capture rollers being coupled together by a second slide plate.

14. The coupling assembly of claim 1, wherein the actuator is an electric motor.

15. The coupling assembly of claim 1, wherein the actuator is a mechanical link.

16. A method of coupling a passive unit to an active unit, the method comprising:
moving the passive unit towards the active unit, the passive unit having a recess on one face and a plurality of lips disposed within the recess;
positioning at least a portion of the passive unit within a capture envelope adjacent to at least one of a plurality of capture rollers on the active unit;
activating a cam mechanism in the active unit to move the plurality of capture rollers in a first direction from a first position to a second position;
engaging the recess with the plurality of capture rollers to align the passive unit as the plurality of capture rollers move from the first position and second position;
engaging the plurality of lips with the plurality of rollers as the plurality of rollers move from the first position to the second position; and
move the plurality of capture rollers in a second direction to move the passive unit into a docked position, the second direction being perpendicular to the first direction.

17. The method of claim 16, further comprising:
fixing the cam mechanism in a stowed position with a launch lock device; and
activating the launch lock device prior to moving the cam mechanism from the stowed position to a deployed position.

18. The method of claim 16, wherein the activating of the cam mechanism includes moving the cam mechanism from stowed position to a deployed position.

19. The method of claim 17, wherein the moving of the cam mechanism from the stowed position to the deployed position further comprises:
rotating a gear with an actuator;
rotating at least one first lead-screw with the gear;
moving an elevator plate along the lead-screw in response to the rotation of the lead-screw; and
causing the plurality of capture rollers to move in the first direction in response to movement of the elevator plate.

20. A method of coupling a passive unit to an active unit, the method comprising:
moving the passive unit towards the active unit, the passive unit having a recess on one face and a plurality of lips disposed within the recess;
positioning at least a portion of the passive unit within a capture envelope adjacent to at least one of a plurality of capture rollers on the active unit;
activating a cam mechanism in the active unit to move the plurality of capture rollers in a first direction from a first position to a second position;
engaging the recess to align the passive unit as the plurality of capture rollers move from the first position and second position;
engaging the plurality of lips with the plurality of rollers as the plurality of rollers move from the first position to the second position;
move the plurality of capture rollers in a second direction to move the passive unit into a docked position, the second direction being perpendicular to the first direction;
fixing the cam mechanism in a stowed position with a launch lock device; and
activating the launch lock device prior to moving the cam mechanism from the stowed position to a deployed position, wherein the moving of the cam mechanism from the stowed position to the deployed position further comprises:
rotating a gear with an actuator,
rotating at least one first lead-screw with the gear,
moving an elevator plate along the lead-screw in response to the rotation of the lead-screw, and
causing the plurality of capture rollers to move in the first direction in response to movement of the elevator plate,
wherein the causing of the plurality of capture rollers to move in the first direction further includes moving a roller assembly along a first cam slot in the elevator plate, and
wherein the movement of the plurality of capture rollers in the second direction further includes moving the roller assembly along a second cam slot in a static cam plate.

21. The method of claim 20, further comprising:
rotating a central lead screw with the gear; and
axially moving a first connector in a third direction in response to the rotation of the central lead screw.

22. The method of claim 21, further comprising connecting the first connector to a second connector when the cam mechanism is in the deployed position and the passive unit is in the docked position.

\* \* \* \* \*